(12) United States Patent
Tehranchi et al.

(10) Patent No.: US 7,043,019 B2
(45) Date of Patent: May 9, 2006

(54) COPY PROTECTION FOR DIGITAL MOTION PICTURE IMAGE DATA

(75) Inventors: Babak Tehranchi, San Diego, CA (US); Paul W. Jones, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 759 days.

(21) Appl. No.: 09/796,201

(22) Filed: Feb. 28, 2001

(65) Prior Publication Data

US 2002/0168069 A1    Nov. 14, 2002

(51) Int. Cl.
    *H04N 7/167* (2006.01)
(52) U.S. Cl. .................. 380/218; 380/218; 380/10; 380/15; 380/17; 380/202; 380/252; 380/201; 380/205; 380/221; 380/238; 382/100; 382/284; 382/248; 382/232; 352/40; 713/176
(58) Field of Classification Search ............... 380/218, 380/15, 10, 19, 202, 252, 201, 205, 221, 380/238, 17; 352/40; 382/100, 284, 248, 382/232; 713/176; 358/3.28
See application file for complete search history.

(56) References Cited

U.S. PATENT DOCUMENTS

| | | | |
|---|---|---|---|
| 4,644,422 A | 2/1987 | Bedini | |
| 4,901,351 A * | 2/1990 | Tanaka et al. ............... | 380/223 |
| 5,303,294 A | 4/1994 | Kimoto et al. | |
| 5,530,759 A | 6/1996 | Braudaway et al. | |
| 5,663,927 A | 9/1997 | Olson et al. | |
| 5,680,454 A | 10/1997 | Mead | |
| 5,706,061 A * | 1/1998 | Marshall et al. ............ | 348/743 |
| 5,757,910 A | 5/1998 | Rim | |
| 5,809,139 A | 9/1998 | Girod et al. | |
| 5,875,249 A | 2/1999 | Mintzer et al. | |
| 5,883,959 A | 3/1999 | Kori | |
| 5,912,972 A | 6/1999 | Barton | |
| 5,949,885 A | 9/1999 | Leighton | |
| 5,959,717 A | 9/1999 | Chaum | |
| 5,960,081 A | 9/1999 | Vynne et al. | |
| 6,018,374 A | 1/2000 | Wrobleski | |
| 6,031,914 A | 2/2000 | Tewfik et al. | |

(Continued)

FOREIGN PATENT DOCUMENTS

WO    WO 00/74366 A2    12/2000

(Continued)

OTHER PUBLICATIONS

"Flicker Fusion and Harmonic Analysis" by D.H. Kelly, *Journal of the Optical Society of America*, vol. 51, p. 917-918.

(Continued)

*Primary Examiner*—Christopher Revale
*Assistant Examiner*—Shin-Hon Chen
(74) *Attorney, Agent, or Firm*—Norman Rushefsky

(57) ABSTRACT

An apparatus and method for displaying a copy-deterrent pattern (104) within a digital motion picture in order to discourage recording of the motion picture using a video camera or other sampling recording device. A copy-deterrent pattern (104) could be, for example, one or more symbols, a random pattern, a digital watermark or a text message (106). The copy-deterrent pattern (104) comprises a plurality of pixels within each frame of the digital motion picture, and the displayed pixel intensities are modulated at a temporal frequency using modulation characteristics deliberately selected to be imperceptible to human observers while simultaneously producing objectionable aliasing in any copy made using a video camera.

49 Claims, 18 Drawing Sheets

U.S. PATENT DOCUMENTS

| | | |
|---|---|---|
| 6,037,984 A | 3/2000 | Isnardi et al. |
| 6,041,158 A | 3/2000 | Sato |
| 6,044,156 A | 3/2000 | Honsinger et al. |
| 6,069,914 A | 5/2000 | Cox |
| 6,529,600 B1 * | 3/2003 | Epstein et al. ............... 380/252 |
| 6,614,914 B1 * | 9/2003 | Rhoads et al. ............... 382/100 |
| 6,674,876 B1 * | 1/2004 | Hannigan et al. ........... 382/100 |
| 2001/0032315 A1 * | 10/2001 | Van Overveld et al. .... 713/176 |
| 2004/0120523 A1 * | 6/2004 | Haitsma et al. ............. 380/239 |

FOREIGN PATENT DOCUMENTS

| | | |
|---|---|---|
| WO | WO 01/33846 A2 | 5/2001 |
| WO | WO 01/56279 A2 | 8/2001 |

OTHER PUBLICATIONS

"*Visual Responses to Time—Dependent Stimuli. I. Amplitude Sensitivity Measurements*" by D.H. Kelly, *Journal of the Optical Society of America*, vol. 51, No. 4, pp. 422-429.

"*Visual Responses to Time-Dependent Stimuli: III Individual Variations*" by D.H. Kelly, *Journal of the Optical Society of America*, vol. 52, No. 1, p. 89.

* cited by examiner

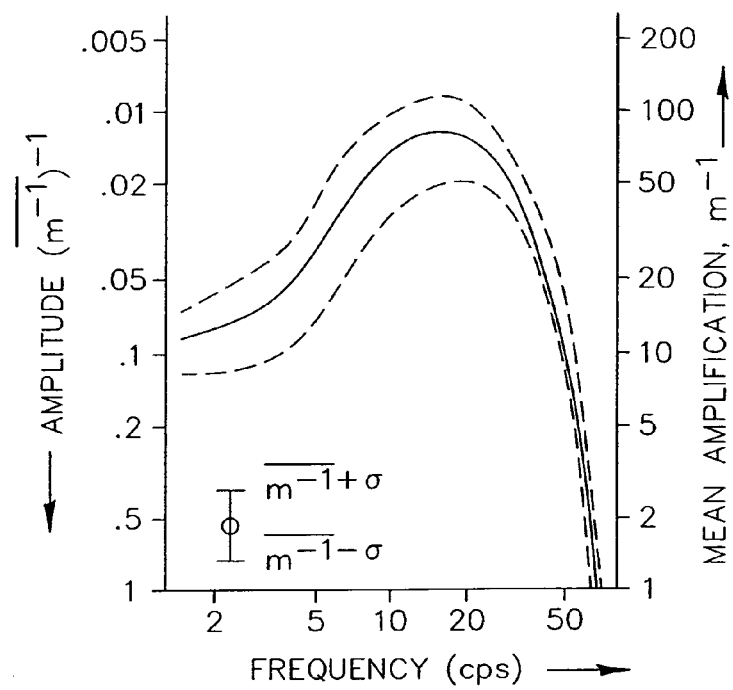
FIG. 1 FLICKER SENSITIVITY OF HUMAN EYE
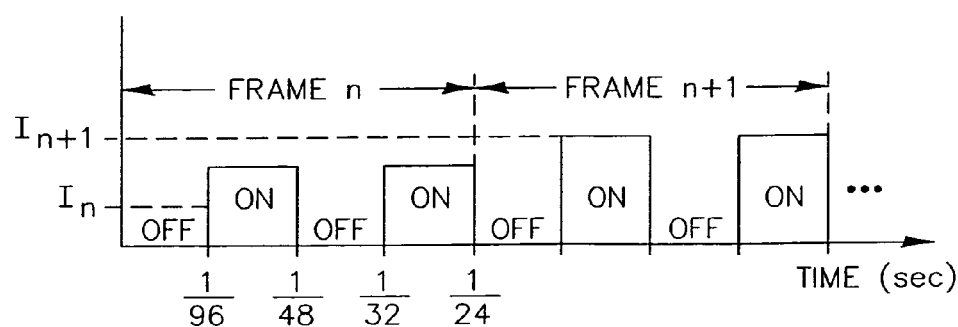
FIG. 2 THE CONCEPT OF DOUBLE SHUTTERING IN TRADITIONAL MOVIE PROJECTION

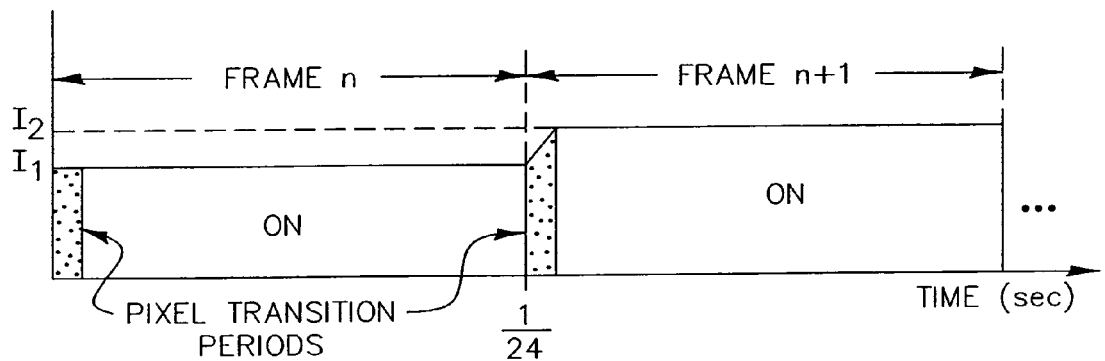
FIG. 3 THE CONCEPT OF DIGITAL MOVIE PROJECTION
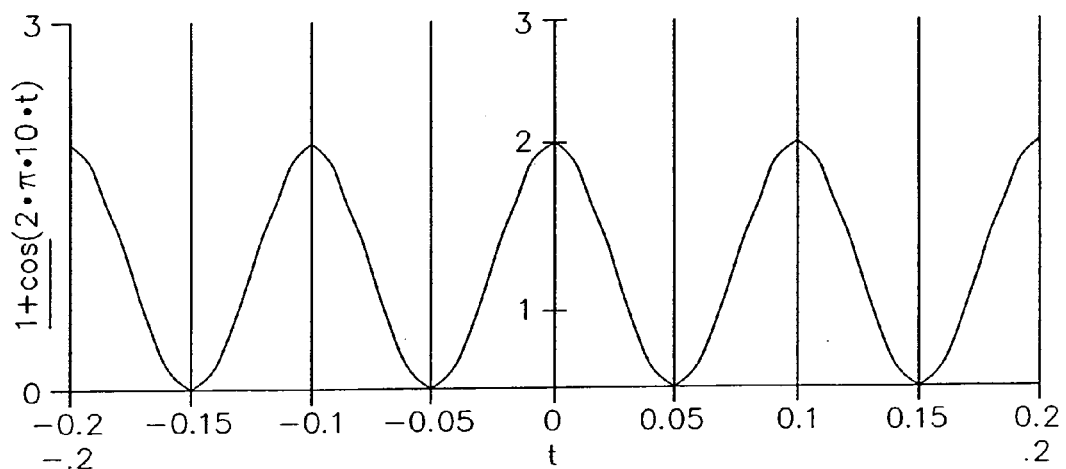
FIG. 4 TIME DOMAIN REPRESENTATION, f(t), WITH OSCILLATION FREQUENCY $\xi_m = 10$

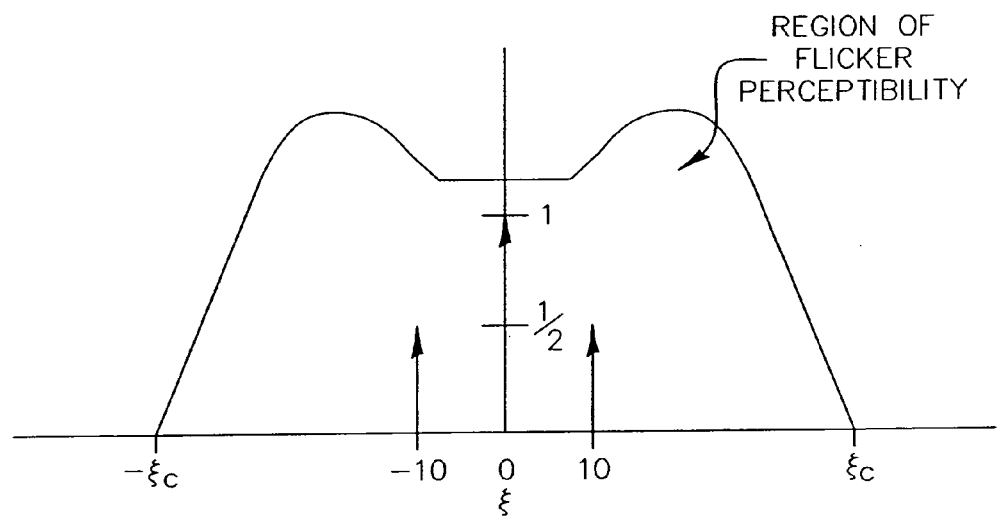
FIG. 5 FREQUENCY DOMAIN REPRESENTATION, $F(\xi)$, WITH OSCILLATION FREQUENCY $\xi_m=10$ (VISIBLE FLICKER)
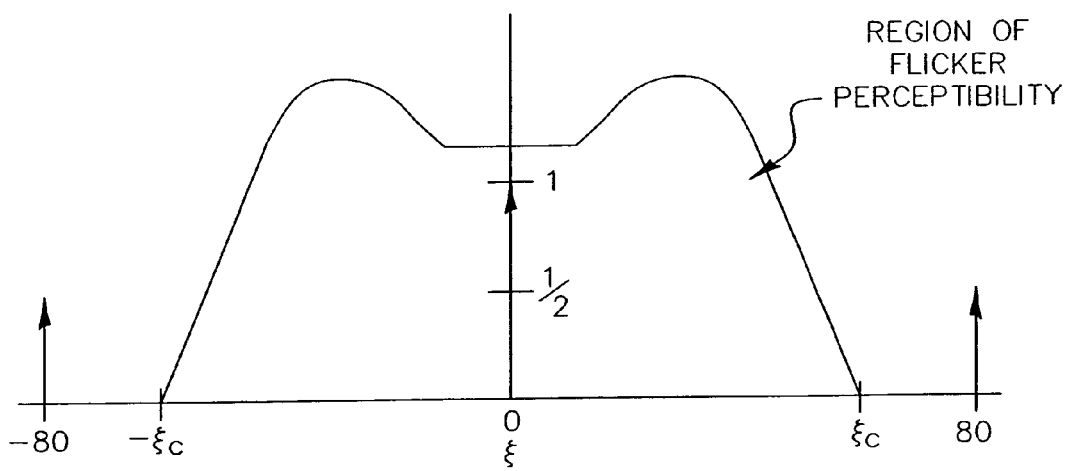
FIG. 6 FREQUENCY DOMAIN REPRESENTATION, $F(\xi)$, WITH OSCILLATION FREQUENCY $\xi_m=80$ (INVISIBLE FLICKER)

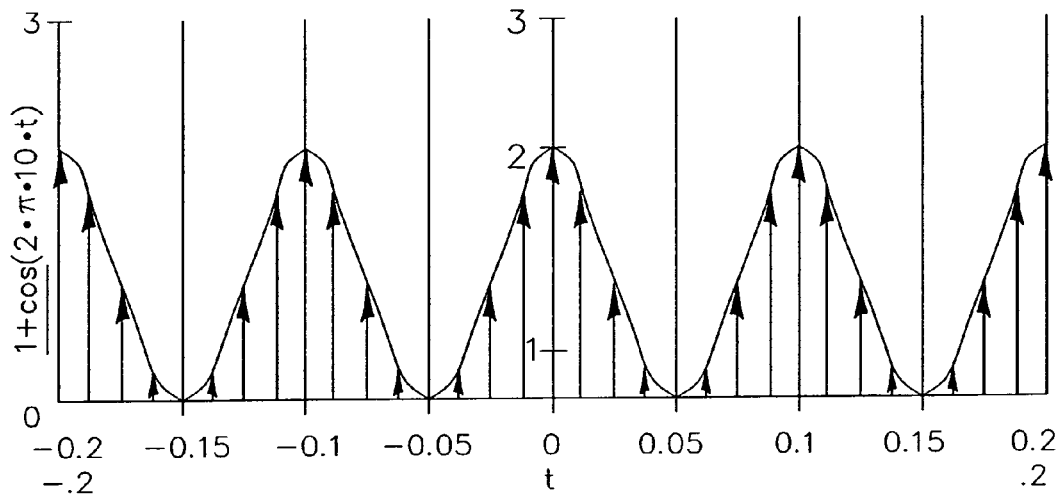
FIG. 7 TIME DOMAIN REPRESENTATION OF SAMPLED FUNCTION, $f_s(t)$ WITH $\xi_m=10$ AND $\xi_s=80$
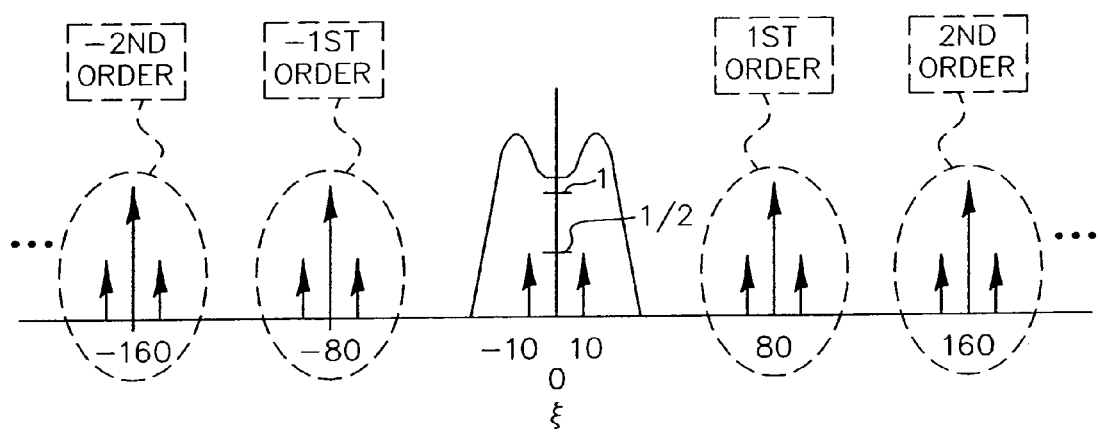
FIG. 8 SPECTRUM OF SAMPLED FUNCTION, $F_s(\xi)$ WITH $\xi_m=10$ AND $\xi_s=80$

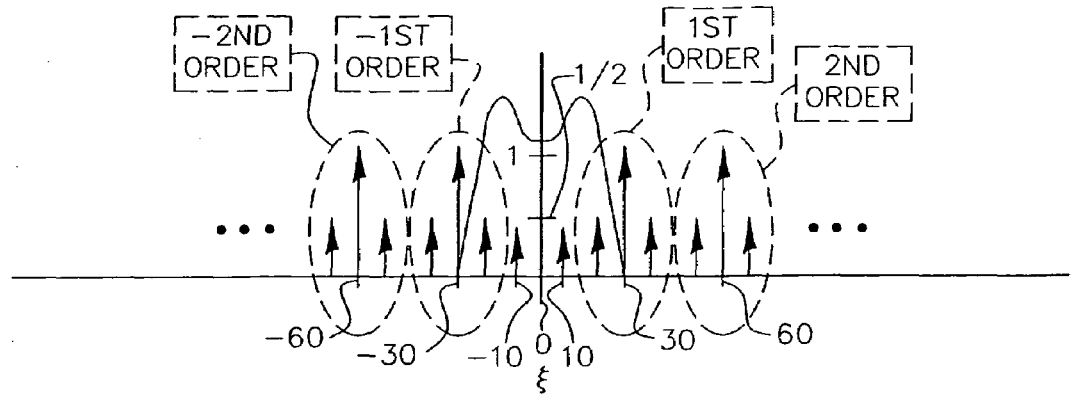
FIG. 9 SPECTRUM OF $f_s(t)$, WITH $\xi_m=10$ AND $\xi_s=30$.
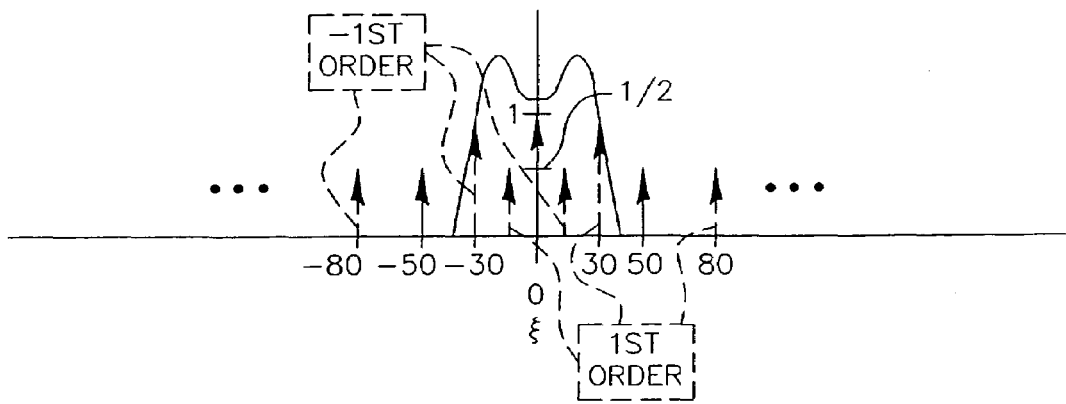
FIG. 10 ALIASED $F_s(\xi)$ WITH $\xi_m=50$ AND $\xi_s=30$; SOLID LINES SHOW $0^{th}$ ORDER; DOTTED LINES SHOW $\pm 1^{st}$ ORDERS

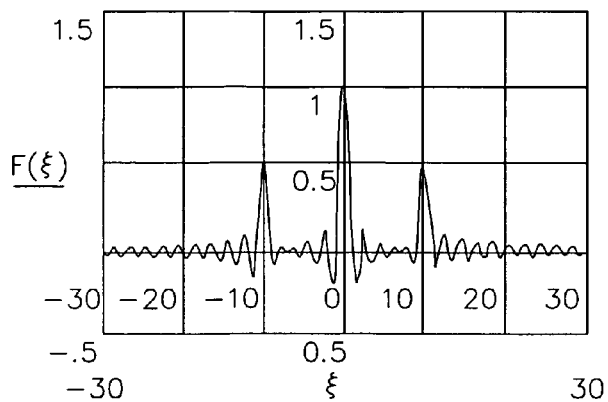
SPECTRAL BROADENING:
$F(\xi)=[\delta(\xi)+1/2[\delta(\xi-\xi_m)+\delta(\xi+\xi_m)]]*\text{sinc}(\xi/\xi_D)$
WITH $\xi_m=10$ AND D
VALUES SHOWN
$(D=10\ t_m)$
*FIG. 11a*
SPECTRAL BROADENING:
$F(\xi)=[\delta(\xi)+1/2[\delta(\xi-\xi_m)+\delta(\xi+\xi_m)]]*\text{sinc}(\xi/\xi_D)$
WITH $\xi_m=10$ AND D
VALUES SHOWN
$(D=5\ t_m)$
*FIG. 11b*
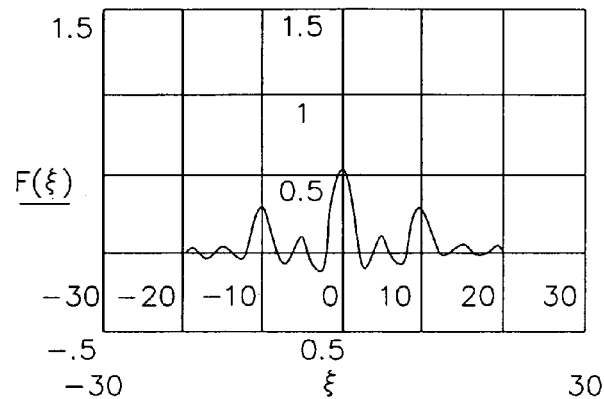
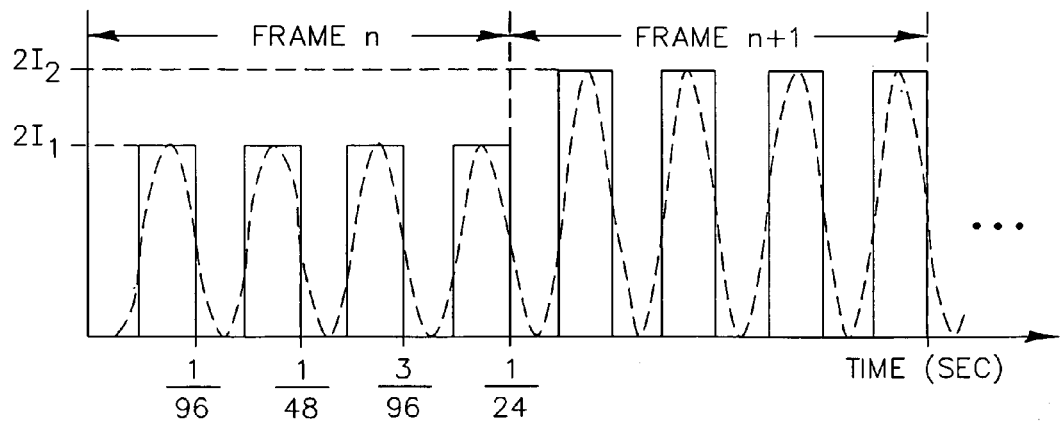
*FIG. 12* THE CONCEPT OF FLICKER INTRODUCTION IN DIGITALLY PROJECTED PIXELS

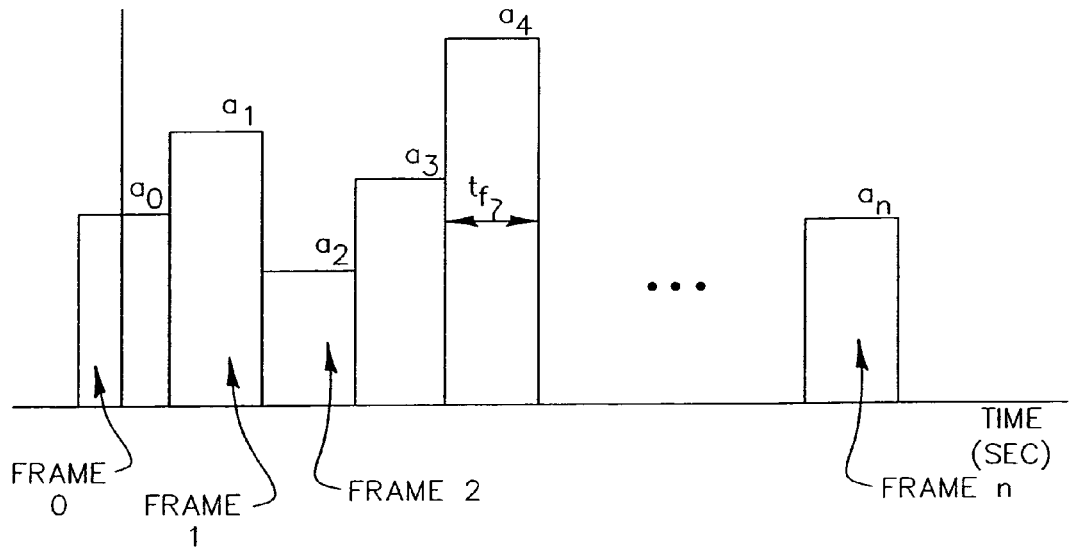
FIG. 13  PIXEL INTENSITY VALUES FOR n CONSECUTIVE FRAMES
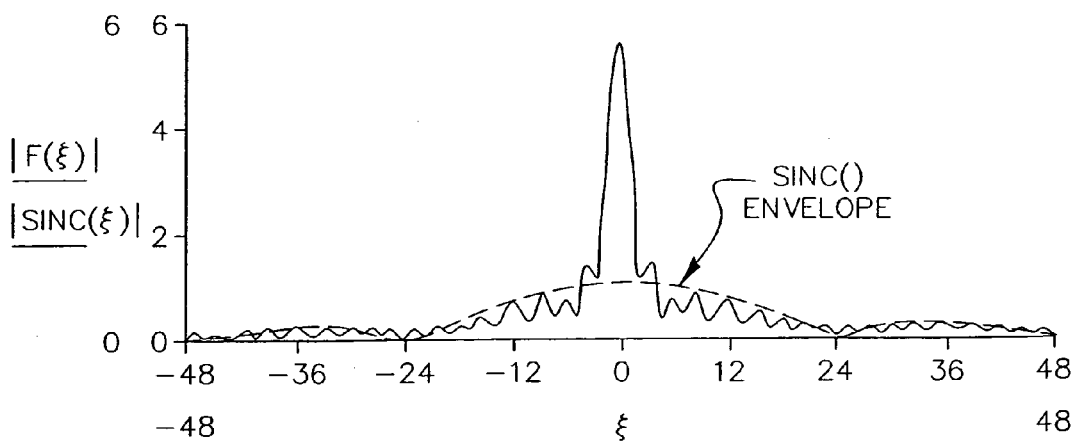
FIG. 14  SPECTRUM OF THE TIME-VARYING FUNCTION OF FIG. 13 WITH $n=9$, $t_f=1/24$ AND $(a_0, a_1, a_2, a_3, a_4, a_5, a_6, a_7, a_8, a_9) = (1, 0.7, 0.8, 0.7, 0.6, 0.4, 0.5, 0.3, 0.4, 0.2)$ SPECTRUM OF THE MODULATED TIME-VARYING FUNCTION
OF FIG.13 WITH n=9, $t_f=1/24$, $t_m=1/48$ AND
$(a_0,a_1,a_2,a_3,a_4,a_5,a_6,a_7,a_8,a_9)=$
(1, 0.7, 0.8, 0.7, 0.6, 0.4, 0.5, 0.3, 0.4, 0.2)

SPECTRUM OF THE SAMPLED TIME-VARYING FUNCTION OF
FIG.13 WITH n=9, $t_f=1/24$, $t_s=1/180$ AND
$(a_0,a_1,a_2,a_3,a_4,a_5,a_6,a_7,a_8,a_9)=$
(1, 0.7, 0.8, 0.7, 0.6, 0.4, 0.5, 0.3, 0.4, 0.2)

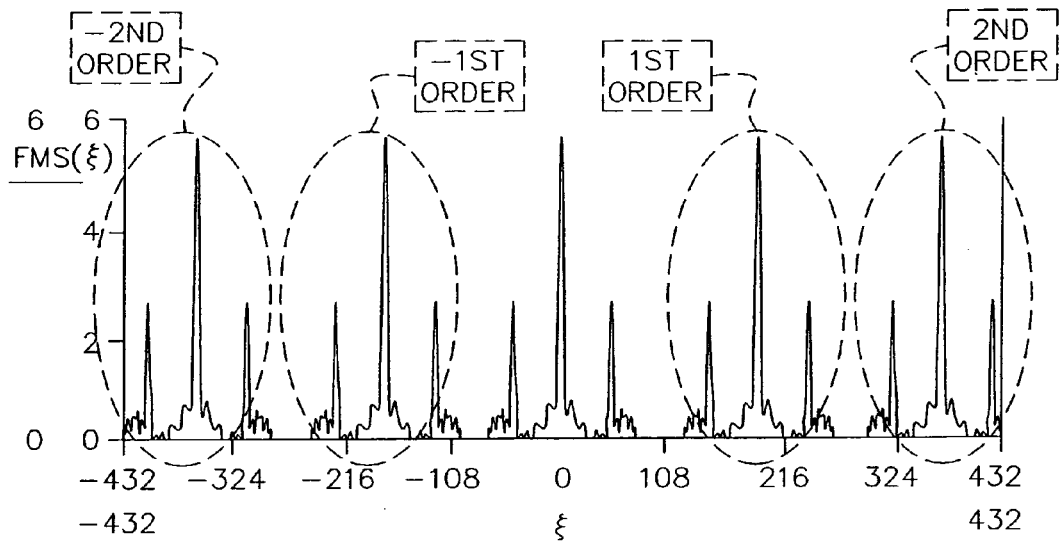
FIG. 17 SPECTRUM OF SAMPLED AND MODULATED FUNCTION OF FIG.13 WITH $n=9$, $t_f=1/24$, $t_m=1/48$, $t_s=1/180$ AND $(a_0, a_1, a_2, a_3, a_4, a_5, a_6, a_7, a_8, a_9) =$
(1, 0.7, 0.8, 0.7, 0.6, 0.4, 0.5, 0.3, 0.4, 0.2)
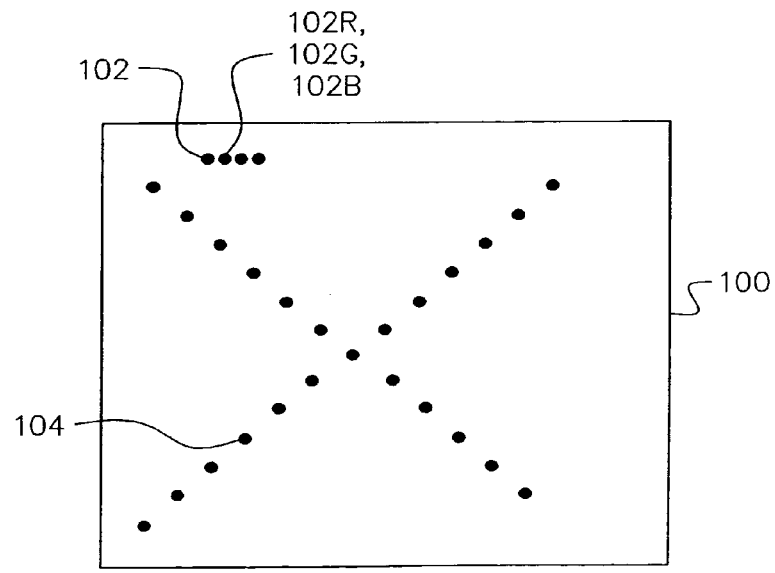
FIG. 18

TABLE 2. SPECTRAL SPREAD FOR MAIN, LEFT AND RIGHT
FREQUENCY BANDS FOR W/2=30 HERTZ AND $\xi s$=120 Hz

W/2  30   $\xiس$ 120

| | 1ST SPECTRAL ORDER | | | | | | 2ND SPECTRAL ORDER | | | | | |
|---|---|---|---|---|---|---|---|---|---|---|---|---|
| | LEFT BAND | | MAIN BAND | | RIGHT BAND | | LEFT BAND | | MAIN BAND | | RIGHT BAND | |
| $\xi m$ | FROM | TO | FROM | TO | FROM | TO | FROM | TO | FROM | TO | FROM | TO |
| 50 | 40 | 100 | 90 | 150 | 140 | 200 | 160 | 220 | 210 | 270 | 260 | 320 |
| 55 | 35 | 95 | 90 | 150 | 145 | 205 | 155 | 215 | 210 | 270 | 265 | 325 |
| 60 | 30 | 90 | 90 | 150 | 150 | 210 | 150 | 210 | 210 | 270 | 270 | 330 |
| 65 | 25 | 85 | 90 | 150 | 155 | 215 | 145 | 205 | 210 | 270 | 275 | 335 |
| 70 | 20 | 80 | 90 | 150 | 160 | 220 | 140 | 200 | 210 | 270 | 280 | 340 |
| 75 | 15 | 75 | 90 | 150 | 165 | 225 | 135 | 195 | 210 | 270 | 285 | 345 |
| 80 | 10 | 70 | 90 | 150 | 170 | 230 | 130 | 190 | 210 | 270 | 290 | 350 |
| 85 | 5 | 65 | 90 | 150 | 175 | 235 | 125 | 185 | 210 | 270 | 295 | 355 |
| 90 | 0 | 60 | 90 | 150 | 180 | 240 | 120 | 180 | 210 | 270 | 300 | 360 |
| 95 | −5 | 55 | 90 | 150 | 185 | 245 | 115 | 175 | 210 | 270 | 305 | 365 |
| 100 | −10 | 50 | 90 | 150 | 190 | 250 | 110 | 170 | 210 | 270 | 310 | 370 |
| 105 | −15 | 45 | 90 | 150 | 195 | 255 | 105 | 165 | 210 | 270 | 315 | 375 |
| 110 | −20 | 40 | 90 | 150 | 200 | 260 | 100 | 160 | 210 | 270 | 320 | 380 |
| 115 | −25 | 35 | 90 | 150 | 205 | 265 | 95 | 155 | 210 | 270 | 325 | 385 |
| 120 | −30 | 30 | 90 | 150 | 210 | 270 | 90 | 150 | 210 | 270 | 330 | 390 |
| 125 | −35 | 25 | 90 | 150 | 215 | 275 | 85 | 145 | 210 | 270 | 335 | 395 |
| 130 | −40 | 20 | 90 | 150 | 220 | 280 | 80 | 140 | 210 | 270 | 340 | 400 |
| 135 | −45 | 15 | 90 | 150 | 225 | 285 | 75 | 135 | 210 | 270 | 345 | 405 |
| 140 | −50 | 10 | 90 | 150 | 230 | 290 | 70 | 130 | 210 | 270 | 350 | 410 |
| 145 | −55 | 5 | 90 | 150 | 235 | 295 | 65 | 125 | 210 | 270 | 355 | 415 |
| 150 | −60 | 0 | 90 | 150 | 240 | 300 | 60 | 120 | 210 | 270 | 360 | 420 |
| 155 | −65 | −5 | 90 | 150 | 245 | 305 | 55 | 115 | 210 | 270 | 365 | 425 |
| 160 | −70 | −10 | 90 | 150 | 250 | 310 | 50 | 110 | 210 | 270 | 370 | 430 |
| 165 | −75 | −15 | 90 | 150 | 255 | 315 | 45 | 105 | 210 | 270 | 375 | 435 |
| 170 | −80 | −20 | 90 | 150 | 260 | 320 | 40 | 100 | 210 | 270 | 380 | 440 |
| 175 | −85 | −25 | 90 | 150 | 265 | 325 | 35 | 95 | 210 | 270 | 385 | 445 |
| 180 | −90 | −30 | 90 | 150 | 270 | 330 | 30 | 90 | 210 | 270 | 390 | 450 |
| 185 | −95 | −35 | 90 | 150 | 275 | 335 | 25 | 85 | 210 | 270 | 395 | 455 |
| 190 | −100 | −40 | 90 | 150 | 280 | 340 | 20 | 80 | 210 | 270 | 400 | 460 |
| 195 | −105 | −45 | 90 | 150 | 285 | 345 | 15 | 75 | 210 | 270 | 405 | 465 |
| 200 | −110 | −50 | 90 | 150 | 290 | 350 | 10 | 70 | 210 | 270 | 410 | 470 |
| 205 | −115 | −55 | 90 | 150 | 295 | 355 | 5 | 65 | 210 | 270 | 415 | 475 |
| 210 | −120 | −60 | 90 | 150 | 300 | 360 | 0 | 60 | 210 | 270 | 420 | 480 |

*FIG. 25*

TABLE 3. SPECTRAL SPREAD FOR MAIN, LEFT AND RIGHT FREQUENCY BANDS FOR W/2=24 HERTZ AND $\xi s$=120 Hz

W/2  24    $\xi s$  120

|  | 1ST SPECTRAL ORDER | | | 2ND SPECTRAL ORDER | | |
|---|---|---|---|---|---|---|
| | LEFT BAND | MAIN BAND | RIGHT BAND | LEFT BAND | MAIN BAND | RIGHT BAND |
| $\xi m$ | FROM TO | FROM TO | FROM TO | FROM TO | FROM TO | FROM TO |
| 50 | 46  94 | 96  144 | 146  194 | 166  214 | 216  264 | 266  314 |
| 55 | 41  89 | 96  144 | 151  199 | 161  209 | 216  264 | 271  319 |
| 60 | 36  84 | 96  144 | 156  204 | 156  204 | 216  264 | 276  324 |
| 65 | 31  79 | 96  144 | 161  209 | 151  199 | 216  264 | 281  329 |
| 70 | 26  74 | 96  144 | 166  214 | 146  194 | 216  264 | 286  334 |
| 75 | 21  69 | 96  144 | 171  219 | 141  189 | 216  264 | 291  339 |
| 80 | 16  64 | 96  144 | 176  224 | 136  184 | 216  264 | 296  344 |
| 85 | 11  59 | 96  144 | 181  229 | 131  179 | 216  264 | 301  349 |
| 90 | 6  54 | 96  144 | 186  234 | 126  174 | 216  264 | 306  354 |
| 95 | 1  49 | 96  144 | 191  239 | 121  169 | 216  264 | 311  359 |
| 100 | −4  44 | 96  144 | 196  244 | 116  164 | 216  264 | 316  364 |
| 105 | −9  39 | 96  144 | 201  249 | 111  159 | 216  264 | 321  369 |
| 110 | −14  34 | 96  144 | 206  254 | 106  154 | 216  264 | 326  374 |
| 115 | −19  29 | 96  144 | 211  259 | 101  149 | 216  264 | 331  379 |
| 120 | −24  24 | 96  144 | 216  264 | 96  144 | 216  264 | 336  384 |
| 125 | −29  19 | 96  144 | 221  269 | 91  139 | 216  264 | 341  389 |
| 130 | −34  14 | 96  144 | 226  274 | 86  134 | 216  264 | 346  394 |
| 135 | −39  9 | 96  144 | 231  279 | 81  129 | 216  264 | 351  399 |
| 140 | −44  4 | 96  144 | 236  284 | 76  124 | 216  264 | 356  404 |
| 145 | −49  −1 | 96  144 | 241  289 | 71  119 | 216  264 | 361  409 |
| 150 | −54  −6 | 96  144 | 246  294 | 66  114 | 216  264 | 366  414 |
| 155 | −59  −11 | 96  144 | 251  299 | 61  109 | 216  264 | 371  419 |
| 160 | −64  −16 | 96  144 | 256  304 | 56  104 | 216  264 | 376  424 |
| 165 | −69  −21 | 96  144 | 261  309 | 51  99 | 216  264 | 381  429 |
| 170 | −74  −26 | 96  144 | 266  314 | 46  94 | 216  264 | 386  434 |
| 175 | −79  −31 | 96  144 | 271  319 | 41  89 | 216  264 | 391  439 |
| 180 | −84  −36 | 96  144 | 276  324 | 36  84 | 216  264 | 396  444 |
| 185 | −89  −41 | 96  144 | 281  329 | 31  79 | 216  264 | 401  449 |
| 190 | −94  −46 | 96  144 | 286  334 | 26  74 | 216  264 | 406  454 |
| 195 | −99  −51 | 96  144 | 291  339 | 21  69 | 216  264 | 411  459 |
| 200 | −104  −56 | 96  144 | 296  344 | 16  64 | 216  264 | 416  464 |
| 205 | −109  −61 | 96  144 | 301  349 | 11  59 | 216  264 | 421  469 |
| 210 | −114  −66 | 96  144 | 306  354 | 6  54 | 216  264 | 426  474 |

*FIG. 26*

TABLE 4. SPECTRAL SPREAD FOR MAIN, LEFT AND RIGHT
FREQUENCY BANDS FOR W/2=12 HERTZ AND $\xi_s$=120 Hz

W/2  12    $\xi_s$  120

| $\xi_m$ | LEFT BAND FROM TO | 1ST SPECTRAL ORDER MAIN BAND FROM TO | RIGHT BAND FROM TO | LEFT BAND FROM TO | 2ND SPECTRAL ORDER MAIN BAND FROM TO | RIGHT BAND FROM TO |
|---|---|---|---|---|---|---|
| 50 | 58  82 | 108  132 | 158  182 | 178  202 | 228  252 | 278  302 |
| 55 | 53  77 | 108  132 | 163  187 | 173  197 | 228  252 | 283  307 |
| 60 | 48  72 | 108  132 | 168  192 | 168  192 | 228  252 | 288  312 |
| 65 | 43  67 | 108  132 | 173  197 | 163  187 | 228  252 | 293  317 |
| 70 | 38  62 | 108  132 | 178  202 | 158  182 | 228  252 | 298  322 |
| 75 | 33  57 | 108  132 | 183  207 | 153  177 | 228  252 | 303  327 |
| 80 | 28  52 | 108  132 | 188  212 | 148  172 | 228  252 | 308  332 |
| 85 | 23  47 | 108  132 | 193  217 | 143  167 | 228  252 | 313  337 |
| 90 | 18  42 | 108  132 | 198  222 | 138  162 | 228  252 | 318  342 |
| 95 | 13  37 | 108  132 | 203  227 | 133  157 | 228  252 | 323  347 |
| 100 | 8  32 | 108  132 | 208  232 | 128  152 | 228  252 | 328  352 |
| 105 | 3  27 | 108  132 | 213  237 | 123  147 | 228  252 | 333  357 |
| 110 | −2  22 | 108  132 | 218  242 | 118  142 | 228  252 | 338  362 |
| 115 | −7  17 | 108  132 | 223  247 | 113  137 | 228  252 | 343  367 |
| 120 | −12  12 | 108  132 | 228  252 | 108  132 | 228  252 | 348  372 |
| 125 | −17  7 | 108  132 | 233  257 | 103  127 | 228  252 | 353  377 |
| 130 | −22  2 | 108  132 | 238  262 | 98  122 | 228  252 | 358  382 |
| 135 | −27  −3 | 108  132 | 243  267 | 93  117 | 228  252 | 363  387 |
| 140 | −32  −8 | 108  132 | 248  272 | 88  112 | 228  252 | 368  392 |
| 145 | −37  −13 | 108  132 | 253  277 | 83  107 | 228  252 | 373  397 |
| 150 | −42  −18 | 108  132 | 258  282 | 78  102 | 228  252 | 378  402 |
| 155 | −47  −23 | 108  132 | 263  287 | 73  97 | 228  252 | 383  407 |
| 160 | −52  −28 | 108  132 | 268  292 | 68  92 | 228  252 | 388  412 |
| 165 | −57  −33 | 108  132 | 273  297 | 63  87 | 228  252 | 393  417 |
| 170 | −62  −38 | 108  132 | 278  302 | 58  82 | 228  252 | 398  422 |
| 175 | −67  −43 | 108  132 | 283  307 | 53  77 | 228  252 | 403  427 |
| 180 | −72  −48 | 108  132 | 288  312 | 48  72 | 228  252 | 408  432 |
| 185 | −77  −53 | 108  132 | 293  317 | 43  67 | 228  252 | 413  437 |
| 190 | −82  −58 | 108  132 | 298  322 | 38  62 | 228  252 | 418  442 |
| 195 | −87  −63 | 108  132 | 303  327 | 33  57 | 228  252 | 423  447 |
| 200 | −92  −68 | 108  132 | 308  332 | 28  52 | 228  252 | 428  452 |
| 205 | −97  −73 | 108  132 | 313  337 | 23  47 | 228  252 | 433  457 |
| 210 | −102  −78 | 108  132 | 318  342 | 18  42 | 228  252 | 438  462 |

*FIG. 27*

TABLE 5. SPECTRAL SPREAD FOR MAIN, LEFT AND RIGHT
FREQUENCY BANDS FOR W/2=5 HERTZ AND $\xi_s$=120 Hz

W/2  5    $\xi_s$  120

| | 1ST SPECTRAL ORDER | | | 2ND SPECTRAL ORDER | | |
|---|---|---|---|---|---|---|
| | LEFT BAND | MAIN BAND | RIGHT BAND | LEFT BAND | MAIN BAND | RIGHT BAND |
| $\xi_m$ | FROM TO | FROM TO | FROM TO | FROM TO | FROM TO | FROM TO |
| 50 | 65   75 | 115  125 | 165  175 | 185  195 | 235  245 | 285  295 |
| 55 | 60   70 | 115  125 | 170  180 | 180  190 | 235  245 | 290  300 |
| 60 | 55   65 | 115  125 | 175  185 | 175  185 | 235  245 | 295  305 |
| 65 | 50   60 | 115  125 | 180  190 | 170  180 | 235  245 | 300  310 |
| 70 | 45   55 | 115  125 | 185  195 | 165  175 | 235  245 | 305  315 |
| 75 | 40   50 | 115  125 | 190  200 | 160  170 | 235  245 | 310  320 |
| 80 | 35   45 | 115  125 | 195  205 | 155  165 | 235  245 | 315  325 |
| 85 | 30   40 | 115  125 | 200  210 | 150  160 | 235  245 | 320  330 |
| 90 | 25   35 | 115  125 | 205  215 | 145  155 | 235  245 | 325  335 |
| 95 | 20   30 | 115  125 | 210  220 | 140  150 | 235  245 | 330  340 |
| 100 | 15   25 | 115  125 | 215  225 | 135  145 | 235  245 | 335  345 |
| 105 | 10   20 | 115  125 | 220  230 | 130  140 | 235  245 | 340  350 |
| 110 | 5   15 | 115  125 | 225  235 | 125  135 | 235  245 | 345  355 |
| 115 | 0   10 | 115  125 | 230  240 | 120  130 | 235  245 | 350  360 |
| 120 | −5   5 | 115  125 | 235  245 | 115  125 | 235  245 | 355  365 |
| 125 | −10   0 | 115  125 | 240  250 | 110  120 | 235  245 | 360  370 |
| 130 | −15  −5 | 115  125 | 245  255 | 105  115 | 235  245 | 365  375 |
| 135 | −20  −10 | 115  125 | 250  260 | 100  110 | 235  245 | 370  380 |
| 140 | −25  −15 | 115  125 | 255  265 | 95  105 | 235  245 | 375  385 |
| 145 | −30  −20 | 115  125 | 260  270 | 90  100 | 235  245 | 380  390 |
| 150 | −35  −25 | 115  125 | 265  275 | 85   95 | 235  245 | 385  395 |
| 155 | −40  −30 | 115  125 | 270  280 | 80   90 | 235  245 | 390  400 |
| 160 | −45  −35 | 115  125 | 275  285 | 75   85 | 235  245 | 395  405 |
| 165 | −50  −40 | 115  125 | 280  290 | 70   80 | 235  245 | 400  410 |
| 170 | −55  −45 | 115  125 | 285  295 | 65   75 | 235  245 | 405  415 |
| 175 | −60  −50 | 115  125 | 290  300 | 60   70 | 235  245 | 410  420 |
| 180 | −65  −55 | 115  125 | 295  305 | 55   65 | 235  245 | 415  425 |
| 185 | −70  −60 | 115  125 | 300  310 | 50   60 | 235  245 | 420  430 |
| 190 | −75  −65 | 115  125 | 305  315 | 45   55 | 235  245 | 425  435 |
| 195 | −80  −70 | 115  125 | 310  320 | 40   50 | 235  245 | 430  440 |
| 200 | −85  −75 | 115  125 | 315  325 | 35   45 | 235  245 | 435  445 |
| 205 | −90  −80 | 115  125 | 320  330 | 30   40 | 235  245 | 440  450 |
| 210 | −95  −85 | 115  125 | 325  335 | 25   35 | 235  245 | 445  455 |

*FIG. 28*

COPY PROTECTION FOR DIGITAL MOTION PICTURE IMAGE DATA

FIELD OF THE INVENTION

This invention generally relates to an apparatus for displaying a time-varying copy-deterrent pattern when projecting a digital motion picture, the copy-deterrent pattern not visible to a viewing audience but visible in a recording of the motion picture made using a video capture device such as a video camera.

BACKGROUND OF THE INVENTION

Movie piracy is a cause of substantial revenue loss to the motion picture industry. Illegally copied movies, filmed during projection with video cameras or camcorders and similar devices, are a significant contributing factor to revenue loss. Even the questionable quality of copies pirated in this fashion does not prevent them from broad distribution in the "black market", especially in some overseas markets, and on the Internet. As video cameras improve in imaging quality and become smaller and more capable, the threat of illegal copying activity becomes more menacing to motion picture providers. While it may not be possible to completely eliminate theft by copying, it can be advantageous to provide display delivery techniques that frustrate anyone who attempts to copy a motion picture using a portable video camera device.

It is known to provide a distinct symbol or watermark to an original still image as a means of image or copy identification, such as in order to authenticate a copy. As examples, U.S. Pat. No. 5,875,249 (Mintzer et al.), U.S. Pat. No. 6,031,914 (Tewfik et al.), U.S. Pat. No. 5,912,972 (Barton), and U.S. Pat. No. 5,949,885 (Leighton) disclose methods of applying a perceptually invisible watermark to image data as verification of authorship or ownership or as evidence that an image has not been altered. However, where such methods identify and validate image data, they provide no direct means of protection against copying an image, such as using a conventional scanner and color printer. In contrast, U.S. Pat. No. 5,530,759 (Braudaway et al.) discloses providing a visible, color correct watermark that is generated by altering brightness characteristics but not chromaticity of specific pixels in the image. But the approach used in U.S. Pat. No. 5,530,759 could be objectionable if used for a motion picture, since the continuing display of a watermark on film could annoy an audience and adversely affect the viewing experience.

The above examples for still-frame images illustrate a key problem: an invisible watermark identifies but does not adversely affect the quality of an illegal copy, while a visible watermark can be distracting and annoying. With video and motion picture images, there can be yet other problems with conventional image watermarking. For example, U.S. Pat. No. 5,960,081 (Vynne et al.) discloses applying a hidden watermark to MPEG data using motion vector data. But this method identifies and authenticates the original compressed data stream and would not provide identification for a motion picture that was copied using a camcorder. Other patents, such as U.S. Pat. No. 5,809,139 (Girod et al.), U.S. Pat. No. 6,069,914 (Cox), and U.S. Pat. No. 6,037,984 (Isnardi et al.) disclose adding an imperceptible watermark directly to the discrete cosine transform (DCT) coefficients of a MPEG-compressed video signal. If such watermarked images are subsequently recompressed using a lossy compression method (such as by a camcorder, for example) or are modified by some other image processing operation, the watermark may no longer be detectable.

The invisible watermarking schemes disclosed in the patents listed above add a watermark directly to the compressed bit stream of an image or image sequence. Alternatively, there are other watermarking schemes that add the watermark to the image data itself, rather than to the compressed data representation. An example of such a scheme is given in U.S. Pat. No. 6,044,156 (Honsinger et al.), which discloses a spread spectrum technique using a random phase carrier. However, regardless of the specific method that is used to embed a watermark, there is always a concern that a watermarking method be robust, that is, able to withstand various "attacks" that can remove or alter the watermark. Some attacks may be deliberately aimed at the underlying structure of a given watermarking scheme and require detailed knowledge of watermarking techniques applied. However, most attack methods are less sophisticated, performing common modifications to the image such as using lossy compression, introducing lowpass filtering, or cropping the image, for example. Such modifications can be made when a video camera is used to capture a displayed motion picture. These methods present a constant threat that a watermark may be removed during the recording process.

The watermarking schemes noted above are directed to copy identification, ownership, or authentication. However, even if a watermarking approach is robust, provides copy control management, and succeeds in identifying the source of a motion picture, an invisible watermark may not be a sufficient deterrent for illegal copying.

As an alternative to watermarking, some copy deterrent schemes used in arts other than video or movie display operate by modifying a signal or inserting a different signal to degrade the quality of any illegal copies. The modified or inserted signal does not affect playback of a legally obtained manufactured copy, but adversely impacts the quality of an illegally produced copy. As one example, U.S. Pat. No. 5,883,959 (Kori) discloses deliberate modification of a burst signal to foil copying of a video. Similarly, U.S. Pat. No. 6,041,158 (Sato) and U.S. Pat. No. 5,663,927 (Ryan) disclose modification of expected video signals in order to degrade the quality of an illegal copy. As yet another example of this principle, U.S. Pat. No. 4,644,422 (Bedini) discloses adding a degrading signal to discourage copying of audio recordings. An audio signal having a frequency at and above the high threshold frequency range for human hearing is selectively inserted into a recording. The inserted signal is not detectable to the listener. However, any unauthorized attempt to copy the recording onto tape obtains a degraded copy, since the inserted audio signal interacts adversely with the bias oscillator frequency of a tape recording head.

The above-mentioned copy protection schemes disclose the use of a deliberately injected signal introduced in order to degrade the quality of an electronic copy. While such methods may be effective for copy protection of data from a tape or optical storage medium, these methods do not discourage copying of a motion picture image using a video camera.

As a variation of the general method where a signal is inserted that does not impact viewability but degrades copy quality, U.S. Pat. No. 6,018,374 (Wrobleski) discloses the use of a second projector in video and motion picture presentation. This second projector is used to project an infrared (IR) message onto the display screen, where the infrared message can contain, for example, a date/time stamp, theater identifying text, or other information. The infrared message is not visible to the human eye. However, because a video camera has broader spectral sensitivity that includes the IR range, the message will be clearly visible in any video camera copy made from the display screen. The same technique can be used to distort a recorded image with an "overlaid" infrared image. While the method disclosed in U.S. Pat. No. 6,018,374 can be effective for frustrating casual camcorder recording, the method has some drawbacks. A more sophisticated video camera operator could minimize the effect of a projected infrared watermark using a filter designed to block infrared light. Video cameras are normally provided with some amount of IR filtering to compensate for silicon sensitivity to IR. With a focused watermark image, such as a text message projected using infrared light, retouching techniques could be applied to alter or remove a watermark, especially if the infrared signal can be located within frame coordinates and is consistent, frame to frame. A further drawback of the method disclosed in U.S. Pat. No. 6,018,374 relates to the infrared light source itself. Since an infrared lamp can generate significant amounts of heat, it may not be practical to project a watermark or copy deterrent image over a large area of the display screen using only an IR source.

Motion picture display and video recording standards have well-known frame-to-frame refresh rates. In standard motion picture projection, for example, each film frame is typically displayed for a time duration of $\frac{1}{24}$ second. Respective refresh rates for interlaced NTSC and PAL video recording standards are $\frac{1}{60}$ second and $\frac{1}{50}$ second. Video camera capabilities such as variable shutter speeds allow close synchronization of a video camera with film projection, making it easier for illegal copies to be filmed within a theater. Attempts to degrade the quality of such a copy include that disclosed in U.S. Pat. No. 5,680,454 (Mead). U.S. Pat. No. 5,680,454, which discloses use of a pseudo-random variation in frame rate, causing successive motion picture frames to be displayed at slightly different rates than nominal. Using this method, for example, frame display periods would randomly change between $\frac{1}{23}$ and $\frac{1}{25}$ second for a nominal $\frac{1}{24}$ second display period. Timing shifts within this range would be imperceptible to the human viewer, but significantly degrade the quality of any copy filmed using a video camera Randomization, as used in the method of U.S. Pat. No. 5,680,454, would prevent resynchronization of the video camera to a changed display frequency. While the method of U.S. Pat. No. 5,680,454 may degrade the image quality of a copy made by video camera, this method does have limitations. As noted in the disclosure of U.S. Pat. No. 5,680,454, the range of frame rate variability is constrained, since the overall frame rate must track reasonably closely with accompanying audio. Also, such a method does not provide a mechanism for including any type of spatial pattern or watermark in each frame, which could be used to provide a human-readable warning message or to trace the individual copy of the film that was illegally recorded.

U.S. Pat. No. 5,959,717 (Chaum) also discloses a method and apparatus for copy prevention of a displayed motion picture work. The apparatus of U.S. Pat. No. 5,959,717 includes a film projector along with a separate video projector. The video projector can be used, for example, to display an identifying or cautionary message or an obscuring pattern that is imperceptible to human viewers but can be recorded using a video camera Alternately, the video camera may even display part of the motion picture content itself. By controlling the timing of the video projector relative to film projector timing, a message or pattern can be made that will be recorded when using a video camera, but will be imperceptible to a viewing audience. The method of U.S. Pat. No. 5,959,717, however, has some drawbacks. Notably, this method requires distribution of a motion picture in multiple parts, which greatly complicates film replication and distribution. Separate projectors are required for the film-based and video-based image components, adding cost and complexity to the system and to its operation. Image quality, particularly for large-screen environments, may not be optimal for video projection and alignment of both projectors to each other and to the display surface must be precisely maintained.

Conventional methods such as those described above could be adapted to provide some measure of copy deterrence and watermarking for digital motion pictures. However, none of the methods noted above is wholly satisfactory, for the reasons stated. None of the existing copy protection or watermarking methods takes advantage of key characteristics of the digital motion picture environment that would prevent successful recording using a video camera.

While the capability for encoding "passive" invisible digital watermarks within digital images data has been developed, there is a need for more aggressive copy-deterrence techniques that can be embedded within digital motion picture data content and can take full advantage of digital projector technology.

Image aliasing is a well-known effect that results from a difference between the scan line or frame refresh rate of an electronic display or motion picture and the sampling rate of a video camera. Inherently, image aliasing imposes some constraints on the image quality of a video camera recording made from a display screen. Thus it is known that simply varying a scan or refresh rate may result in increased levels of aliasing. For example, video projectors from Silicon Light Machines, Sunnyvale, Calif., use a high scan rate and complex segmented scanning sequence that can corrupt a video-taped copy by producing vertical black bars in the captured image. Similar effects are also observed when one tries to capture an image from a computer screen with a camcorder. These are the result of differences in scan rates between the display and the video camera systems. These techniques, however, offer a somewhat limited capability for protection, since scan synchronization of video camera apparatus makes it feasible to override this protection. Moreover, aliasing caused by simple scan rate differences does not provide a suitable vehicle for display of a warning message or other pattern in a taped copy or for digital watermarking in order to identify the source of the original image.

In a fully digital motion picture system, the spectral content and timing of each displayed pixel is known and can be controlled for each frame. While there can be a standard refresh rate for screen pixels (corresponding to the $\frac{1}{24}$ or $\frac{1}{30}$ second frame rate used for motion picture film or video displays), there may be advantages in altering the conventional "frame-based" model for motion picture display. Each displayed pixel on the screen can be individually addressed within any frame, and its timing characteristics can be modified as needed. This capability has, however, not been used for displaying a copy-deterrent pattern.

Therefore, it can be seen that there is clearly a need for a method that allows embedding of a copy-deterrent pattern within motion picture content, where the content is projected from digital data. It would be most advantageous for such a pattern to be invisible to a viewer but recordable using a video camera. Further, it can be seen that there is a need for a method that uses the opportunity for control of timing and of individual screen pixel content that digital motion picture technology offers in order to discourage movie piracy using a video camera.

SUMMARY OF THE INVENTION

With the above description in mind, it is an object of the present invention to provide a method and apparatus for displaying, within a projected frame of a digital motion picture, said frame comprising an array of pixels, a copy-deterrent pattern, said pattern comprising a plurality of pixels selected from said frame, said pattern not visible to a human viewer but perceptible when sampled and displayed using a video capture device, the method comprising modulating said pattern at a modulation rate and modulation scheme selected to maximize signal aliasing when said digital motion picture is sampled by said video capture device.

It is another object of the present invention to provide a copy-deterrent projection apparatus for projecting a digital motion picture onto a display screen, said digital motion picture comprising a sequential plurality of frames, each of said frames comprising an array of pixels, each said pixel assigned to be projected at a predetermined intensity for the duration of each said frame, said apparatus comprising:

(a) a pattern generator capable of specifying a pattern of pixels within each said frame and capable of modulating said pattern at a modulating frequency and using a modulation timing capable of being varied so as to produce a modulated pattern, said modulating frequency chosen for aliasing with the displayed digital motion picture when sampled by a video capture device, said pattern generator also capable of specifying a variable intensity level for each said pixel within said pattern of pixels;

(b) an image forming assembly capable of accepting said modulated pattern specified by said pattern generator and of projecting onto said display screen, within each said frame, said modulated pattern.

A feature of the present invention is the deliberate use of modulation frequency and modulation timing in order to obtain aliasing of the projected image when sampled using a video capture device. At the same time, however, modulation effects are not perceptible to a human viewer.

It is an advantage of the present invention that it provides an apparatus and method for obscuring an illegal copy of a projected digital motion picture, where said apparatus and method apply copy protection at the time of projection.

It is a further advantage of the present invention that it provides a method for displaying a copy-deterrent effect that is imperceptible to a viewing audience.

It is a further advantage of the present invention that it allows digital watermarking of projected digital motion picture frames using modulation of projected pixels at frequencies that are not perceptible to a viewing audience.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1 is a graph showing relative sensitivity of the human eye to flicker;

FIG. 2 is a graph showing the timing arrangement used for double-shuttering with conventional film projection;

FIG. 3 is a graph showing the timing arrangement for a single pixel in digital motion picture projection;

FIG. 4 is a graph showing a time-domain representation of a raised cosine having an oscillation frequency of 10 Hz;

FIG. 5 is a graph showing a frequency-domain representation of a visible signal, flickering at 10 Hz;

FIG. 6 is a graph showing a frequency-domain representation of a signal oscillating at 80 Hz;

FIG. 7 is a graph showing a time-domain representation of a function oscillating at 10 Hz and sampled at 80 Hz;

FIG. 8 is a graph showing a frequency-domain representation of the sampled function of FIG. 7;

FIG. 9 is a graph showing a frequency-domain representation of the function of FIG. 7 sampled at 30 Hz;

FIG. 10 is a graph showing a frequency-domain representation of an aliasing condition for a sampled, oscillating function;

FIG. 11a is a graph showing a frequency-domain representation of a sinusoidally oscillating function truncated to contain only 10 cycles;

FIG. 11b is a graph showing a frequency-domain representation of a sinusoidally oscillating function truncated to contain only 5 cycles;

FIG. 12 is a graph showing a time-domain representation of an introduced flicker effect for a pixel;

FIG. 13 is a graph showing changing pixel intensity values for n consecutive frames of a digital motion picture;

FIG. 14 is a graph showing a frequency-domain representation of the changing pixel intensity values of FIG. 13;

FIG. 17 is a graph showing a frequency-domain representation of the time-varying function of FIG. 13, modulated and sampled;

FIG. 18 is a plane view showing a digital motion picture frame having a pattern;

FIGS. 25–28 are tables 2, 3, 4 and 5, respectively, as referred to in the specification.

DETAILED DESCRIPTION OF THE INVENTION

Figure 15:
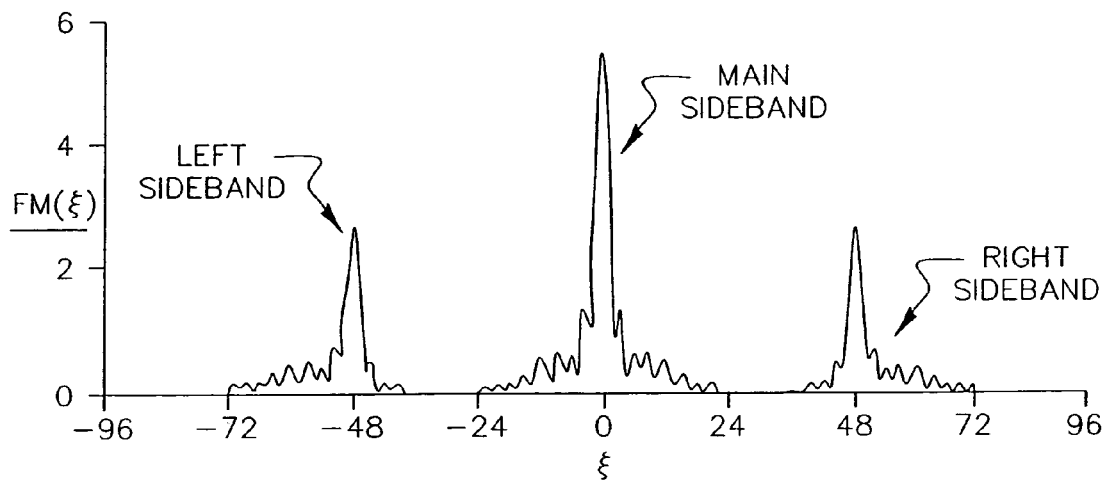
FIG. 15 is a graph showing a frequency-domain representation of the intensity values of FIG. 13, modulated.

The present description is directed in particular to elements forming part of, or cooperating more directly with, apparatus in accordance with the invention. It is to be understood that elements not specifically shown or described may take various forms well known to those skilled in the art.

The present invention provides a method and apparatus capable of providing copy protection and watermarking for digital motion picture display. The present invention accomplishes this purpose by introducing, as part of the displayed images, a copy-deterrent pattern that is imperceptible to a human observer, but that is clearly perceptible when captured using a video camera or related image capture device that uses sampling for image capture. In order to adequately disclose an implementation for practice of the present invention, it is first necessary to describe specific boundaries within which the method and apparatus of the present invention operate.

Sensitivity of the Human Visual System to Time-Varying Stimuli

The first boundary of interest relates to the flicker sensitivity of the human visual system. Flicker sensitivity refers to the perception of a light source with time-varying intensity (e.g., a strobe light) as a steady illumination source.

For a time-varying stimulus at a given temporal frequency and under a given set of viewing conditions, such as image display size and adaptation level, an average threshold amplitude can be identified at which the time-varying stimulus is no longer perceived as flickering (that is, the flicker-fusion threshold). Studies show that sensitivity of the human visual system to sinusoidal intensity oscillations decreases dramatically at higher temporal frequencies. (Reference is made to Kelly, D. H., "Visual Responses to Time-Dependent Stimuli: Amplitude Sensitivity Measurements" in Journal of the Optical Society of America, Volume 51, No. 4, p. 422 and to Kelly, D. H., "Visual Responses to Time-Dependent Stimuli: III Individual Variations" in Journal of the Optical Society of America, Volume 52, No. 1, p. 89). Referring to FIG. 1, which shows the flicker-fusion threshold as a function of temporal frequency, human visual system sensitivity to flicker is maximized near the 10–30 cycles/sec range, drops off rapidly at just above 30 cycles/sec, and continues to drop as temporal frequency increases. For temporal frequencies above a cutoff frequency, there is essentially no perception of flicker regardless of the stimulus amplitude. This cutoff frequency occurs somewhere around 50–70 Hz for the light adaptation levels that occur in typical display systems.

Although the flicker sensitivity results shown in FIG. 1 refer to sinusoidal intensity oscillations, it is possible to derive similar curves for other types of time-varying stimuli. Of particular interest are squares waves, which have distinct "ON" and "OFF" phases, as opposed to the continuously varying characteristics of sinusoids. For square waves, it is possible to compute a "duty cycle" which is the proportion of the ON interval in a full ON/OFF cycle. A typical duty cycle is 50%, meaning that the ON and OFF intervals are equal. However, it is also possible to create stimuli with longer duty cycles, so that the ON duration is greater than the OFF duration within a single cycle. In addition, other stimuli might have a non-zero light intensity during the OFF phase, so that the stimuli are never completely dark. In general, studies have shown that increasing the duty cycle and/or increasing the intensity during the OFF phase results in reduced flicker sensitivity. It has been demonstrated that the sensitivity variations for many different stimuli can be explained by considering the amplitude of the fundamental frequency component of the stimulus waveform. (Reference is made to Kelly, D. H., "Flicker Fusion and Harmonic Analysis" in Journal of the Optical Society of America, Volume 51, p. 917.)

Relevant to the present invention, when a sequence of motion picture frames is displayed at a sufficiently high temporal frequency, a human observer does not detect flicker but instead integrates the sequence of frames to perceive the effect of images in smooth motion. However, video cameras do not use the same detection mechanisms as the human visual system. Thus, it is entirely possible for a time-varying illumination to be captured by a video camera while the human observer detects only a steady illumination.

The object of the present invention is to provide, utilizing this inherent sensitivity of the human visual system and using the ability of a digital motion picture projection system to control timing and intensity levels at each individual pixel, an apparatus and method for frustrating illegal filming of a digital motion picture using a video camera. The present invention operates by inserting a time-varying pattern within successive projected digital motion picture frames, where the time-varying pattern cannot be detected by the unaided eye but is clearly visible from a video camera.

Conventional Versus Digital Motion Picture Projection

Another boundary of interest relates to the nature of motion picture projection as it has evolved using film during the past century, and to new capabilities inherent to digital motion picture projection. It is instructive to distinguish the mode of operation used by display projectors for digital motion pictures from the mode used for film projectors with conventional motion picture films.

A conventional film projection system consists generally of a high brightness arc lamp and a lens assembly that are used to illuminate and project film frames onto the display screen. Film frames are typically captured at 24 frames/sec, but projection at this same rate is undesirable as a 24 Hz frequency is within the region of high flicker sensitivity as noted in the preceding discussion. Therefore, in order to reduce the perceptible flicker of projected films, a technique known as double shuttering is used. Double shuttering increases the effective display rate to 48 frames/sec by alternatively blocking and unblocking the projected light twice during the projection of each frame. This concept is shown in FIG. 2 for an ideal case of two consecutive frames, n and n+1 at intensity levels $I_n$ and $I_{n+1}$, respectively. Double shuttering increases the presentation rate to a frequency at which flicker sensitivity is greatly reduced as compared to the sensitivity at 24 Hz, which allows a film to be viewed without flicker. It is also noted that double shuttering further improves the quality of the projected images by allowing a new frame to settle (during the first "OFF" time) before it is projected on the screen. In a practical situation, there is a finite transition time between the "ON" and "OFF" periods and therefore, the square-shaped blocks of FIG. 2 may be replaced by saw-tooth functions, for example.

In a conventional film projection system, each film frame is illuminated by a light source that has approximately constant intensity across the full extent of the frame. Moreover, each frame is sequentially projected from a film reel, and the average illumination intensity is held constant from frame to frame, as controlled by the shutter. In contrast, digital motion picture display projectors are capable of controlling, for each pixel in a two-dimensional array of pixels, multiple characteristics such as intensity, color, and refresh timing. With digital motion picture projection, the "image frame" presented to the viewer is a projection of this two-dimensional pixel array.

In a digitally projected movie, there is no need for shuttering. The projected frames consist of individual pixels, typically made up of three primary component colors (Red, Green, and Blue, abbreviated RGB) and having variable intensity, where frames are refreshed at regular intervals. This refresh rate may be 1/24 of a second or higher. The transition time for the display of new pixel values, indicated as a pixel transition period in FIG. 3, is short enough that no perceptible flicker artifacts are produced. FIG. 3 shows a typical timing arrangement for a single pixel having two different intensity values, $I_1$ and $I_2$ for frames n and n+1, respectively.

Because motion pictures are typically captured at 24 frames/sec, the description that follows uses a 24 Hz frame refresh rate as the fundamental rate to be used for digital motion picture projection. However, the actual refresh rate could vary. The present invention is capable of adaptation to any standard refresh rate selected. As mentioned, the object of the present invention is to provide an apparatus and method for frustrating illegal filming of a digital motion picture using a video camera, by using the ability of a digital motion picture display system to control timing and intensity levels at each individual pixel.

Sampling of Movie Content by Video Camera

A video camera operates by sampling a scene at regular time intervals. By sampling at a fast enough rate, a video camera can reproduce time-varying scenes with sufficient accuracy for the human visual system to perceive the temporally sampled data as continuous movement.

However, the complication with video camera sampling of a motion picture is that the motion picture display is not truly continuous, as is noted above. Thus, attempting to capture a motion picture using a video camera introduces the complexity of sampling a time-varying image display using time-varying sampling apparatus. Intuitively, it can be seen that some synchronization of sampling rate to refresh rate would be most likely to yield satisfactory results.

It may be possible to adjust the sampling rate of a capturing device to provide synchronization between the video camera capture frequency and the motion picture projector frequency. Frame-to-frame synchronization of a video camera capture frequency to a motion picture projector frequency then enables illegal filming of a displayed motion picture with few, if any, imaging anomalies due to timing differences. The method and apparatus of the present invention is intended to prevent any type of adequate synchronization, thereby deliberately causing interference due to frequency differences to obscure or mark any copy of a motion picture obtained using a video camera.

The baseline sampling rates for video cameras can vary over a range of discrete values. Typical sampling rates for most video cameras commercially available are in a range between 60–120 Hz. For example, the NTSC and PAL video standards, conventionally used for commercially available video cameras, use discrete rates of 50 and 60 fields per second, respectively. Optionally, in some of the so-called flickerless video cameras, multiples of these base rates can be used, allowing higher sampling rates of 100 or 120 Hz, respectively. These rates are, in turn, easily convertible to the 50 and 60 fields per second replay rates that are used in most TVs and VCRs.

It must be noted that the present invention is not constrained to any assumption of video camera sampling rate being at a specific value. However, for the purpose of description, a standard, discrete sampling rate within the 50–120 Hz range is assumed. In subsequent description, sampling rate is represented as $\xi_s$.

With these bounds of human visual system flicker sensitivity, pixel refresh rate of the display, and video camera sampling rate as outlined above, it is next instructive to describe the tools and techniques used for analyzing and describing frequency-related phenomena in general.

Time Domain and Frequency Domain

As is well known in the signal processing arts, it is possible to describe and quantify a time-varying signal in either a time domain or in a frequency domain. The frequency domain is assuredly the less intuitive of the two. However, in order to clearly disclose the functions performed by the apparatus and method of the present invention, it is most illustrative to utilize the descriptive tools and representation of the frequency domain. (The following discussion will highlight those features most pertinent to description of the present invention. A more detailed theoretical description can be found in an upper-level undergraduate or graduate text in linear systems analysis, from which the following description can be derived. The nomenclature used in the subsequent description substantially follows the conventions used in a standard upper-level text, Linear Systems, Fourier Transformers, and Optics, by Jack D. Gaskill, published by John Wiley & Sons, New York, N.Y., 1978.

The frequency domain representation is also sometimes called the signal "spectrum". Within certain constraints, the mathematical transformation between the time and frequency domains is accomplished via Fourier Transformation. Using this transformation tool, the relationship between the function in time domain, f(t), and the function in frequency domain, F($\xi$), may be written as:

$$F(\xi) = \int_{-\infty}^{\infty} f(t) e^{-j2\pi\xi\alpha} d\alpha \qquad (1)$$

$$f(t) = \int_{-\infty}^{\infty} F(\xi) e^{j2\pi t\beta} d\beta \qquad (2)$$

Here, f(t) and F($\xi$) are referred to as Fourier Transform pairs. It can be seen from the above equations that Fourier transformation is reversible or invertible. In other words, if F($\xi$) is the transform of f(t), then f($\xi$) will be the Fourier transform of F(t).

There have been a number of corresponding pairs of invertible functions derived in working between the two domains. Some of the more useful Fourier transform pairs for the present discussion are given in Table 1.

TABLE 1

Exemplary Fourier Transform Pairs

| Time Domain | Frequency Domain |
| --- | --- |
| 1 | $\delta(\xi)$ |
| $\cos(2\pi\xi_0 t)$ | $\frac{1}{2}[\delta(\xi - \xi_0) + \delta(\xi + (\xi_0)]$ |
| rect(t) | sinc($\xi$) |
| comb(t/b) | \|b\| comb(b$\xi$) |
| f(t/b) | \|b\|F(b$\xi$) |
| f(t − c) | $F(\xi)e^{-j2\pi c\xi}$ |

TABLE 1-continued

Exemplary Fourier Transform Pairs

| Time Domain | Frequency Domain |
|---|---|
| f[(t − c)/b] | \|b\| F(ξ) · $e^{-j2\pi c \xi}$ |
| f(t) · g(t) | F(ξ)*G(ξ) |

Notes to Table 1:
b, c and ξ₀ are constants;
δ( ) is Dirac's delta function;
rect[(x − c)/b] is the rectangular function of height 1 and of width b that is centered around c;

$$\text{Sinc}[(x-c)/b] = \frac{\sin\pi\left(\frac{x-c}{b}\right)}{\pi\left(\frac{x-c}{b}\right)}$$

$$\text{comb}(x/b) = |b| \cdot \sum_{n=-\infty}^{\infty} \delta(x-nb)$$

represents an infinite series of delta functions that are separated by b.
Convolution is denoted by "*".

Note that multiplication in one domain corresponds to convolution in the other domain. A shift in one domain corresponds to a linear phase multiplier in the other domain ($e^{-j2\pi b \xi}$ represents the phase).

The functions listed in Table 1 above are ideal, mathematical functions. Such idealized functions are rarely found under actual, measured conditions. However, functions such as these are useful for modeling and for high-level assessment of actual conditions, as will be apparent in subsequent description.

Raised Cosine as Modulation Model

It was noted above that the present invention takes advantage of differences between human eye sensitivity to a flickering pattern and video camera sensitivity to a flickering pattern. In order to describe the present invention clearly, it is beneficial to consider a model type of oscillation that is conceptually simple. For this purpose, the raised cosine function, as shown in FIG. 4, is a suitable model that illustrates how the present invention uses a modulation function to induce flicker in motion image sequences. Peak values of the raised cosine waveform would correspond to periods of highest intensity and valleys would correspond to the periods of lowest intensity on the screen.

The following is the time-domain equation for a "raised cosine" function:

$$f(t) = a[1 + \cos(2\pi \xi_m t)] \quad (3)$$

This function has an oscillation frequency $\xi_m$ and an average or DC level equal to "a". The Fourier transform of f(t) may be calculated as:

$$F(\xi) = a[\delta(\xi) + \tfrac{1}{2}[\delta(\xi-\xi_m) + \delta(\xi+\xi_m)]] \quad (4)$$

FIGS. 4 and 5 show f(t) and its spectrum, F(ξ), respectively, for a raised cosine function. For convenience, the constant amplitude multiplier, a, is omitted from the figures. The function, f(t), may be used to represent an intensity pattern on a movie screen, varying sinusoidally with respect to time. As indicated in FIG. 5, the spectrum of a raised cosine contains three components: the DC component, which is represented by a delta function at the origin, and two discrete frequency components at ±ξ_m (ξ_m=10 Hz in FIG. 5). A region of flicker perceptibility is also indicated in FIG. 5 by the shaded region, with a range ±ξ_c where ξ_c is the cutoff threshold frequency for flicker visibility as in FIG. 1. As the example of FIGS. 4 and 5 shows, a flicker frequency, approximated by a sinusoid at 10 cycles per second, or 10 Hz, as shown in FIG. 4, has spectral frequencies ±ξ_m that are well within the perceptible range.

In contrast to the conditions of FIGS. 4 and 5 where intensity flicker occurs at a 10 Hz oscillation rate, FIG. 6 shows what happens when the rate of intensity flicker is increased, to 80 Hz in this example. Notice that, for the conditions of FIG. 6, spectral frequencies ±ξ_m are not within the perceptible range. In contrast to what occurs under the conditions of FIGS. 4 and 5, a viewer cannot perceive any flickering in pixel intensity if this flickering occurs at a rate of 80 Hz. In terms of FIG. 6, the left and right sidebands that represent spectral frequencies ±ξ_m have moved outside the perceptible range. The viewer perceives only a constant (that is, DC) intensity level.

The spectrum representation shown in FIGS. 5 and 6 are idealized. In practice, actual measured modulated signals do not exhibit a spectrum that is as easily visualized. However, as will be seen subsequently, the representation given in FIGS. 5 and 6 is sufficiently close for illustrating actual modulation behavior.

Sampling Frequency Considerations

As noted above, a video camera operates by periodically sampling an image, unlike the human eye. The rate at which this sampling occurs, that is, the sampling frequency, affects how the video camera responds to a flicker pattern having a specified flicker frequency. The interplay of video camera sampling frequency and display flicker frequency must be considered in order to make effective use of the present invention.

In order to reproduce a time-varying signal, a capture system acquires samples of that signal at given instants in time. Intuitively, if the samples are "close enough" to each other, the time varying signal function may be reproduced with great accuracy. The Shannon-Whittaker sampling theorem quantifies the above statement by indicating how close the samples have to be in order to exactly reproduce a signal function. According to this theorem, if a function, f(t), is band limited (i.e., frequency components of F(ξ) are contained within a limited range of frequencies, |W/2|), then it is only necessary to sample f(t) at $$t_N = \frac{1}{W}$$

intervals, or higher, in order to perfectly reproduce f(t). This theorem is sometimes referred to as the Nyquist Theorem and $$\xi_N = \frac{2W}{2}$$

is referred to as the Nyquist Frequency. Mathematically, sampling of a function in time and frequency domains can be described as follows:

$$f_s(t) = f(t) \cdot |1/t_s|.\mathrm{comb}(t/t_s) \quad (5)$$

$$F_s(\xi) = F(\xi) * \mathrm{comb}(\xi/\xi_s) = |\xi_s| \cdot \sum_{n=-\infty}^{\infty} F(\xi - n\xi_s) \quad (6)$$

where $t_s$ is the sampling interval, $\xi_s = 1/t_s$ is the sampling frequency, and "*" indicates convolution. It should be noted that an idealized "zero-width" sampling function, $|1/t_s| \cdot \mathrm{comb}(t/t_s)$, is used in the following description to facilitate the understanding of the underlying concepts. In practice, rectangular functions of finite width are used for sampling. The ramifications of such sampling functions will be discussed below.

According to the above equations, sampling of a function, f(t), results in the replication of its spectrum, $F(\xi)$, at intervals $\xi_s$ along the frequency axis. The replicates of $F(\xi)$ are referred to as the spectral orders of $f_s(t)$, with $F(\xi - n\xi_s)$ known as the nth spectral order. As a straightforward first approximation for initial analysis, if f(t) is selected to be a raised cosine function, then the sampled function and its spectrum will take the following forms:

$$f_s(t) = a[1 + \cos(2\pi\xi_m t)] \cdot |1/t_s|.\mathrm{comb}(t/t_s) \quad (7)$$

$$F_s(\xi) = \quad (8)$$
$$\sum_{n=-\infty}^{\infty} |a| \cdot |\xi_s| \cdot \left[\delta(\xi - n\xi_s) + \frac{1}{2}[\delta(\xi - \xi_m - n\xi_s) + \delta(\xi + \xi_m - n\xi_s)]\right].$$

FIGS. 7 and 8 depict $f_s(t)$ and $F_s(\xi)$, respectively, for a sampling frequency $\xi_s$ of 80 Hz. The constant multipliers are once again omitted for convenience. Note that in FIG. 8, because of high sampling rate, all spectral orders other than the $0^{th}$ order are outside the region of flicker visibility. In contrast, FIG. 9 shows the spectrum of the same raised cosine function that is sampled at a lower rate of $\xi_s = 30$ Hz. It is evident that some of the frequency components of the $\pm 1^{st}$ orders have moved into the region of flicker visibility when using this lower sampling rate. If the temporally sampled version of f(t) with $\xi_s = 30$ Hz were to be subsequently displayed and viewed by a human observer, extraneous frequency artifacts (i.e., flickers) would be observed in addition to the inherent flicker of the raised cosine at 10 Hz.

It should be noted that where oscillation and sampling frequencies interact as is shown in FIG. 9, there can be some remedial steps taken to minimize frequency artifacts in video camera recording, such as using temporal low-pass filters, for example.

Aliasing

Recalling that the purpose of the present invention is to cause frequency artifacts, it can be seen that there would be advantages in causing signal aliasing, where such aliasing could not then be remedied using low-pass filter techniques. Aliasing is often the cause of visual artifacts in the display of sampled images that contain high frequency components (a familiar example resulting from aliasing is the effect by which carriage or locomotive wheels appear to rotate backwards in early movies).

If the sampling rate, $\xi_s$, is below the Nyquist frequency, the components from higher order harmonics will overlap the $0^{th}$ order components. This phenomenon is known as aliasing. This can be readily visualized by examining FIGS. 8, 9 and 10 in progression. In FIG. 8, only the fundamental or "0 order" frequency components are within the perceptible region; none of the +1 or -1 order components will be perceptible to a viewer. Moving from FIG. 8 to FIG. 9, the affect of a change in sampling frequency $\xi_s$ is illustrated. FIG. 9 shows how reducing the sampling frequency can cause lower order frequency components (shown in dashed lines) to creep toward the origin, into the perceptible region. In FIG. 9, components from the +1 and -1 orders now are within perceptible range.

FIG. 10 shows an example in which a raised cosine intensity pattern has an oscillation frequency of 50 Hz. This results in spectral components at $\pm 50$ Hz. As noted above, the eye does not easily perceive the flicker of this pattern since this oscillation frequency $\xi_m$ is near the visible threshold. Now, if the displayed pattern is captured by a camcorder that has a sampling rate $\xi_s = 30$ Hz, aliased components from higher order harmonics now fall within the region of perceptibility and degrade the viewed image. This is depicted in FIG. 10 with only the $\pm 1^{st}$ order harmonics present. It is evident that the $\pm 2^{nd}$ spectral orders will also introduce some additional frequency artifacts into the perceptible region. For clarity, however, these orders are not shown to avoid cluttering the figure.

Aliasing occurs whenever any portion of the higher order components overlap the 0 order frequency components, as is illustrated in FIG. 10. It was noted above that, given the conditions shown in FIG. 9, a temporal low-pass filter could be employed to isolate only those frequency components of the fundamental order. However, it must be pointed out that aliasing, as illustrated in FIG. 10, does not permit a straightforward remedy using filtering techniques.

At this point, it is instructive to re-emphasize that aliasing, as is used by the present invention, occurs as a result of sampling over discrete intervals, as performed by a video camera. The human eye does not "sample" a motion picture image in the same manner. Thus, aliasing effects as illustrated in FIG. 10 occur only with respect to video camera sampling; a human viewer would not perceive any such aliasing effect in watching the displayed motion picture itself.

The preceding discussion has focused on the interaction of oscillation and sampling frequencies from an idealized theoretical perspective. With the principles of this interaction in mind, it is now instructive to describe some more practical aspects of actual sampling conditions, in order to provide a framework for understanding how to implement the present invention.

Effects of a Finite Sampling Duration

The above description of spectral frequencies and aliasing used an ideal "zero-width" comb sampling function $|1/t_s|\mathrm{comb}(t/t_s)$ as a straightforward first approximation to show the interaction of oscillation and sampling frequencies. The comb function is familiar to those skilled in the digital signal processing arts. In practice, however, sampling functions have a finite integration time duration. For the purpose of this disclosure, this is termed a "finite sampling duration".

A good approximation of a practical function with some finite width is a rectangular function of width (i.e., duration) "d" that is used to sample the function f(t) at fixed intervals $t_s$. In such a case, the sampled time-varying function takes the following form:

$$f_s(t) = f(t) \cdot \left[ \left| \frac{1}{d} \right| rect\left(\frac{t}{d}\right) * \left| \frac{1}{t_s} \right| comb\left(\frac{t}{t_s}\right) \right] \quad (9)$$

that is, equivalent to f(t) times a sampling function. Its corresponding spectrum equivalent takes the following form:

$$F_s(\xi) = \quad (10)$$

$$F(\xi) * \left[ \text{Sinc}(d\xi) \cdot comb\left(\frac{\xi}{\xi_s}\right) \right] = |\xi_s| \cdot \sum_{n=-\infty}^{\infty} [\text{Sinc}(dn\xi_s) \cdot F(\xi - n\xi_s)]$$

Here, the result in the frequency domain can be interpreted again as series of F(ξ) functions that are replicated at ξ$_s$ intervals. But, as equation (10) above shows, the amplitude of each nth spectral order is attenuated by a constant value, that is, by a sinc( ) function evaluated at ξ=dnξ$_s$. Thus, the amplitude of the ±1$^{st}$ orders is attenuated by sinc(dξ$_s$), the amplitude of the ±2$^{nd}$ orders is attenuated by sinc(2dξ$_s$), etc. It is evident that if d<<t$_s$ (that is, the width of the rectangular sampling function is much smaller than the interval between samples), the attenuation due to the sinc( ) function is negligible for the first few spectral orders. However, if the value of d becomes comparable to t$_s$, all spectral orders (other than the 0$^{th}$ order) will undergo attenuation dictated by the sinc( ) envelope. The ramification of this phenomenon is reduced visibility of the higher spectral orders if they fall in the region of flicker perceptibility.

Time-varying Functions of Finite Extent

Referring back to FIGS. 4 and 5, function f(t) was represented as a raised cosine extending from negative infinity to positive infinity. In practice, any time-varying function f(t) must be limited to some finite time interval. In the case of motion pictures this finite time interval corresponds to some portion or the entire presentation length of the movie. This truncation can be mathematically represented by multiplying f(t) by a rectangular function for the duration of interest. Here, the duration (i.e., width of the rectangle) is selected to be D=nt$_f$, where n is an integer typically much greater than 1 and t$_f$ is an arbitrary time interval, usually representing the duration of one movie frame. Then the finite time-varying function f$_f$(t) and its spectrum F$_f$(ξ) can be represented by the following:

$$f_f(t) = f(t) \cdot \frac{1}{|D|} \cdot rect\left(\frac{t}{D}\right) \quad (11)$$

$$F_f(\xi) = F(\xi) * \text{Sinc}\left(\frac{\xi}{\xi_D}\right) \quad (12)$$

where ξ$_D$=1/D.

Note that 2ξ$_D$ is the width of the main lobe of the sin( ) function. The main lobe contains the majority of the energy (i.e., area) of the sinc( ). Examination of the above equations reveals that if the spectral width of the sinc( ) is small compared to the spectral width of F(ξ) (which means that the width, D, of the rectangular function is large), the sinc( ) function effectively acts as a delta function. For example, the spectrum of the raised cosine intensity pattern shown in FIG. 5 would contain narrow sinc( ) functions in place of delta functions. In this case, the pure spectral components at ±ξ$_m$ are replaced by broadened components at ±ξ$_m$ that have the shape of a sinc( ) function. FIG. 11a shows this broadening effect for the raised cosine function truncated to contain 10 cycles (i.e., ξ$_D$=10ξ$_m$). FIG. 11b shows the spectrum for a raised cosine function truncated to contain 5 cycles (i.e., ξ$_D$=5ξ$_m$).

As ξ$_D$ becomes comparable to the spectral extent of F(ξ) (i.e., ξ$_D$≈ξ$_m$), the spectral components overlap. This has no impact on the concepts developed so far, but makes visualization of the spectrum plots somewhat difficult. In a practical implementation of the present invention, the target sequence of images usually contain a large number of frames, and the spectral broadening effects are negligible.

Realistic Intensity Function

Using the raised cosine function as a model, the above description illustrates basic concepts underlying pixel modulation, frequency sampling, and aliasing, all viewed with respect to the frequency domain. The next part of this description considers a more realistic time-varying pixel intensity function f(t). Referring to FIG. 13, there is shown an example intensity function for a pixel over n consecutive image frames. (Pixel transition time, assumed to be small relative to frame duration, is not shown.)

For the example represented in FIG. 13, t$_f$ is the frame duration and parameters a$_0$, a$_1$, . . . , a$_n$ are used to indicate the height of each rectangular function (i.e., the amplitude of the intensity function for duration of frames 0, 1, . . . n, respectively). Mathematically, this train of rectangular functions may be represented as follows:

$$f(t) = a_0 rect\left(\frac{t}{t_f}\right) + a_1 rect\left(\frac{t - t_f}{t_f}\right) + \quad (13)$$

$$a_2 rect\left(\frac{t - 2 \cdot t_f}{t_f}\right) + \ldots + a_n rect\left(\frac{t - n \cdot t_f}{t_f}\right)$$

$$= [a_0 \delta(t) + a_1 \delta(t - t_f) + a_2 \delta(t - 2 \cdot t_f) + \ldots + a_n \delta(t - n \cdot t_f)] * rect\left(\frac{t}{t_f}\right) \quad (14)$$

$$= [a_0 \delta(t) + a_1 \delta(t - t_f) + a_2 \delta(t - 2 \cdot t_f) + \ldots + a_n \delta(t - n \cdot t_f)] * h(t). \quad (15)$$

Equations 13 and 14 are mathematically equivalent. Insight can be gained from examination of equation 14, which presents the time-varying function f(t) as the convolution of a series of weighted and shifted delta functions with a rectangular function of width t$_f$. In the context of digital projection of pixels, each delta function can represent the pixel intensity value for the duration of one frame. Convolution with the recto function effectively spreads (that is, interpolates) the value of each delta function over its frame duration, t$_f$. The rect( ) function, described in this manner, can be considered to be an interpolation or spread function. This description uses rectangular spread functions to represent projected movie pixels. It is significant to note that other formns of spread functions can be used in place of rectangles without compromising the validity of this analysis. Equation (15) describes the projected frame pixels in their most generic form.

The Fourier transform of f(t) from Equation (15) may be written generally as:

$$F(\xi) = \left[a_0 + a_1 \cdot e^{-j2\pi t_f \xi} + a_2 \cdot e^{-j2\pi 2 t_f \xi} + \ldots + a_n \cdot e^{-j2\pi n t_f \xi}\right] \cdot H(\xi) \quad (16a)$$

and, in this particular case:

$$F(\xi) = [a_0 + a_1 \cdot e^{-j2\pi t_f \xi} + a_2 \cdot e^{-j2\pi 2 t_f \xi} + \ldots + a_n \cdot e^{-j2\pi t_f \xi}] \cdot \operatorname{Sinc}\left(\frac{\xi}{\xi_f}\right) \quad (16b)$$

where $\xi_f = 1/t_f$ and $H(\xi)$ is the Fourier transform of the interpolation function h(t). For the example of FIG. 13, the Fourier transform of a rect( ) function is a sinc( ) function, as presented in Equation (16b) above. The term in square brackets is a series of weighted linear phase functions that contains both real and imaginary parts. In order to produce the spectrum plot of $F(\xi)$, amplitude of the term in square brackets must be calculated. This will result in a complicated mathematical amplitude term, $A(\xi)$, that is multiplied by a sinc( ) function:

$$|F(\xi)| = \left|A(\xi) \cdot \operatorname{Sinc}\left(\frac{\xi}{\xi_f}\right)\right|. \quad (17)$$

It is possible to numerically or symbolically evaluate $A(\xi)$ using scientific software packages, as is well known in the linear systems analysis arts. FIG. 14 shows a plot of $|F(\xi)|$ for the case where n=9, $t_f$=1/24 and $a_n$ coefficients that are arbitrarily selected to be: $(a_0, a_1, a_2, a_3, a_4, a_5, a_6, a_7, a_8, a_9)$=(1, 0.7, 0.8, 0.7, 0.6, 0.4, 0.5, 0.3, 0.4, 0.2). The plot of FIG. 14 indicates that the spectrum of this signal is nearly band limited to within ±24 Hz, but the energy of the signal becomes negligible beyond roughly ±12 Hertz.

For the purposes of the present invention, it is not necessary to know the exact form of $|F(\xi)|$ in equation 17, as this quantity depends on varying parameters such as n and $a_n$. Instead, it is beneficial to examine some of the general characteristics of $F(\xi)$. One point to note is that if $A(\xi)$ is evaluated at different values of $\xi$, the highest value for $A(\xi)$ is obtained at $\xi=0$, namely $A(0)=a_0+a_1+\ldots+a_n$. Thus one property of $A(\xi)$ is that its highest value occurs at the origin (that is, the DC value). This property plus the fact that $A(\xi)$ is multiplied by a sinc( ) function, limits the spectral spread of $|F(\xi)|$ to within the first few side lobes of the sinc( ) function. In other words, regardless of the exact form of $A(\xi)$, the spectrum plot of $F(\xi)$ is band limited and follows a sinc( ) envelope (more generally, follows the envelope of the Fourier transform of the spread function, h(t)). The sinc( ) envelope is shown in dashed lines in FIG. 14.

Modulating the Projected Pixel

There are a number of possible modulation schemes that can be employed in order to introduce a flickering pattern that is not perceptible to a human viewer, but that degrades a video camera copy by using the interaction of frequencies described here. For the pixel represented (without flicker) in FIG. 3, the basic concept for adding a flicker effect is illustrated in FIG. 12. Here, a frame interval of 1/24 second is further subdivided into 8 segments which are then used to provide flickering on/off intervals.

It is important to note, as shown in the example of FIG. 12, that average pixel intensity must be maintained in whatever modulation scheme is used. For example, using the timing arrangement of FIG. 12, a pixel is on for ½ of the total time when compared against FIG. 3. This represents a 50% duty cycle. To provide the same average intensity for the pixel, then, the pixel intensity during an on-time must be doubled.

The pulse-width modulation (PWM) technique shown in FIG. 12 gives a flicker frequency of 96 Hz, outside the perceptible range of the human eye. However, such a PWM modulated pixel appears to flicker when recorded and viewed from a typical video camera.

In FIG. 12, an idealized square wave modulation scheme is used. More generally, given a modulation function m(t), the modulated time-varying signal can be written as:

$$f_m(t) = f(t) \cdot m(t) = \{[a_0\delta(t) + a_1\delta(t-t_f) + a_2\delta(t-2\cdot t_f) + \ldots + a_n\delta(t-n\cdot t_f)]*h(t)\} \cdot m(t). \quad (18)$$

For the time-varying function of FIG. 13, with a rectangular interpolation function, this becomes:

$$f_m(t) = \left\{[a_0\delta(t) + a_1\delta(t-t_f) + a_2\delta(t-2\cdot t_f) + \ldots + a_n\delta(t-n\cdot t_f)] * \operatorname{rect}\left(\frac{t}{t_f}\right)\right\} \cdot m(t) \quad (19)$$

In practice, m(t) may be a sinusoidal function (such as the raised cosine discussed earlier) or a train of square waves with 50% duty cycle (as depicted in FIG. 12) or some other time-varying function. In order to simplify the analysis, a raised cosine modulation function is used. This modulation function is shown as dashed lines in FIG. 12. The modulated time-varying function then becomes:

$$f_m(t) = \left\{[a_0\delta(t) + a_1\delta(t-t_f) + a_2\delta(t-2\cdot t_f) + \ldots + a_n\delta(t-n\cdot t_f)] * \operatorname{rect}\left(\frac{t}{t_f}\right)\right\} \cdot \left\{1 + \cos\left(\frac{2\pi t}{t_m}\right)\right\} \quad (20)$$

The Fourier transform of this signal becomes:

$$|F_m(\xi)| = \left|\left\{A(\xi) \cdot \operatorname{Sinc}\left(\frac{\xi}{\xi_f}\right)\right\} * \left\{\delta(\xi) + \frac{1}{2}[\delta(\xi-\xi_m) + \delta(\xi+\xi_m)]\right\}\right| \quad (21)$$

$$= \left|\left\{A(\xi) \cdot \operatorname{Sinc}\left(\frac{\xi}{\xi_f}\right) + \frac{1}{2} \cdot A(\xi-\xi_m) \cdot \operatorname{Sinc}\left(\frac{\xi-\xi_m}{\xi_f}\right) + \frac{1}{2} \cdot A(\xi+\xi_m) \cdot \operatorname{Sinc}\left(\frac{\xi+\xi_m}{\xi_f}\right)\right\}\right|$$

$$= \left|F(\xi) + \frac{1}{2} \cdot F(\xi-\xi_m) + \frac{1}{2} \cdot F(\xi+\xi_m)\right|$$

The modulated spectrum, $F_m(\xi)$, consists of three replicates of the un-modulated signal spectrum, $F(\xi)$, given by equation 17 and plotted in FIG. 14. One of these replicates is located at the origin and the other two, with one-half the amplitude of the original spectrum, are centered respectively around $\pm\xi_m$. In conventional linear systems analysis terminology, F($\xi$), ($\xi-\xi_m$) and F($\xi+\xi_m$) are sometimes referred to as the main band, right sideband and left sideband, respectively. The plot of $F_m(\xi)$ is shown in FIG. 15 for the parameters n=9, $t_f$=1/24, $t_m$=1/48 and $a_n$ coefficients ($a_0$, $a_1$, $a_2$, $a_3$, $a_4$, $a_5$, $a_6$, $a_7$, $a_8$, $a_9$)=(1, 0.7, 0.8, 0.7, 0.6, 0.4, 0.5, 0.3, 0.4, 0.2).

Note that in the absence of modulation, the signal spectrum only contains the first term, F($\xi$). In effect, by introducing modulation into the system, we have advantageously increased the bandwidth (that is, the spectral spread) of the original signal by adding the components F($\xi\pm\xi_m$). It must be stressed once again that if a high enough modulation frequency, $\xi_m$, is selected, the left and right sidebands cannot be seen by the observer. However, the interaction of the modulation frequency with the video camera sampling frequency, $\xi_s$, will result in an aliased signal that is perceptible in the video camera copy.

Sampling the Projected Pixel

As a summary and wrap-up of the theoretical material provided above, it is instructive to illustrate, for a realistic example, the spectral characteristics of a sampled un-modulated signal and to compare these against the spectral characteristics of a sampled modulated signal.

Figure 16:
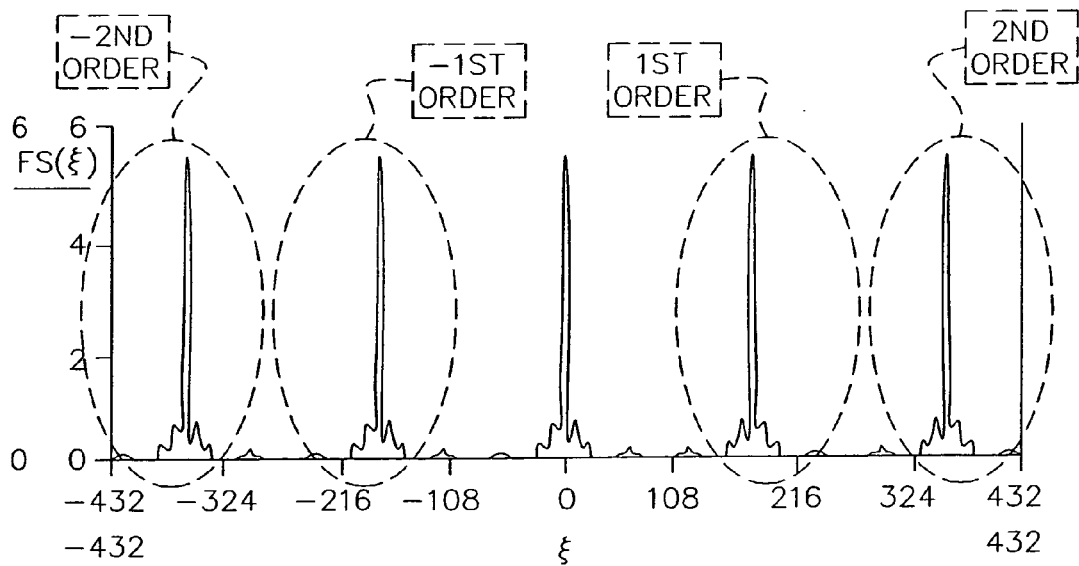
FIG. 16 is a graph showing a frequency-domain representation of the time-varying function of FIG. 13, not modulated, but sampled.

As has been described above, if an un-modulated signal, f(t), is sampled at $t_s$ intervals ($t_s<t_f$), spectral orders appear in the spectrum plot. Referring to FIG. 16, this is shown for the time varying function of FIG. 13, using a sampling frequency of 180 Hz. Mathematically, the Fourier transform of the un-modulated and sampled signal can be written as follows:

$$|F_s(\xi)| = \left|\left\{A(\xi)\cdot \mathrm{Sinc}\left(\frac{\xi}{\xi_f}\right) + A(\xi-\xi_s)\cdot \mathrm{Sinc}\left(\frac{\xi-\xi_s}{\xi_f}\right) + A(\xi+\xi_s)\cdot \mathrm{Sinc}\left(\frac{\xi+\xi_s}{\xi_f}\right) + \ldots\right.\right| \qquad (22)$$

$$= |F(\xi) + F(\xi-\xi_s) + F(\xi+\xi_s) + F(\xi-2\xi_s) + F(\xi+2\xi_s) + \ldots|$$

If, instead of an un-modulated signal, sinusoidally modulated pixel values are sampled at a rate $\xi_s=1/t_s$ (as with a video camera, for example), the spectrum contains broader spectral orders. This is depicted in FIG. 17, using a sampling frequency of 180 Hertz and modulation frequency of 48 Hertz. Mathematically, the spectrum of the sinusoidally modulated and sampled signal can be represented by the following:

$$F_{ms}(\xi) = F_m(\xi) + F_m(\xi-\xi_s) + F_m(\xi+\xi_s) + F_m(\xi-2\xi_s) + F_m(\xi+2\xi_s) + \ldots \qquad (23)$$

$$= \left|F(\xi) + \frac{1}{2}\cdot F(\xi-\xi_m) + \frac{1}{2}\cdot F(\xi+\xi_m)\right| +$$

$$\left|F(\xi-\xi_s) + \frac{1}{2}\cdot F(\xi-\xi_m-\xi_s) + \frac{1}{2}\cdot F(\xi+\xi_m-\xi_s)\right| +$$

$$\left|F(\xi+\xi_s) + \frac{1}{2}\cdot F(\xi-\xi_m+\xi_s) + \frac{1}{2}\cdot F(\xi+\xi_m+\xi_s)\right| +$$

$$\left|F(\xi-2\xi_s) + \frac{1}{2}\cdot F(\xi-\xi_m-2\xi_s) + \frac{1}{2}\cdot F(\xi+\xi_m-2\xi_s)\right| +$$

$$\left|F(\xi+2\xi_s) + \frac{1}{2}\cdot F(\xi-\xi_m+2\xi_s) + \frac{1}{2}\cdot F(\xi+\xi_m+2\xi_s) + \ldots\right.$$

The fundamental order is given by the terms on the second line of equation 23, the $\pm 1^{st}$ orders appear in the third line, etc. According to the Nyquist Theorem, in order to produce aliasing, the sampling frequency must be less than twice the bandwidth of the signal. If spectral spread, W, of F($\xi$) is taken into account, this criterion becomes $\xi_s<2(\xi_m+W/2)$.

It is instructive to note that in the equations derived above, care has been taken to express intensity, modulation, and interpolation functions in a generic form, using f(t), m(t), and h(t). This allows these equations to be applied to any type of real-world function as it may be encountered in digital projection of frames and pixels. In addition, parametric representation of quantities such as modulation frequency $\xi_m$, sampling frequency $\xi_s$, and bandwidth W allow straightforward manipulation using the underlying concepts outlined above.

Therefore, in a practical application for deliberately causing aliasing effects in digital motion picture projection, it is sufficient to employ best approximations of f(t), m(t), h(t), and other variables and, with the aid of linear systems and Fourier analysis tools as developed above, to determine the best conditions for maximum aliasing.

Exemplary Tables and Calculations

For the purpose of describing the method and apparatus of the present invention in detail, it is instructive to provide a summary listing of those variables that must be considered in order to deliberately cause aliasing artifacts when using a video camera to record a digital motion picture. Using the naming conventions employed in the above description, the following parameters must be considered:

(a) Sampling frequency $\xi_s$. This parameter is not in the control of any copy protection method or apparatus. The method of the present invention will be effectively implemented by making some assumptions on likely sampling frequencies that could be used by a video camera when attempting to make a copy of a displayed motion picture. Standard sampling rates widely used by commercially available video cameras include 1/50 second (the standard NTSC rate) and 1/60 second (the standard PAL rate), and so-called "flickerless" speeds of 1/100 second and 1/120 second. Other rates are possible; the method of the present invention be employed where image aliasing appears at the most widely used sampling frequencies as well as in cases where non-standard sampling rates are utilized.

(b) Bandwidth, W, of the unmodulated signal or the one-sided bandwidth, W/2, as is used in some instances throughout this application to denote the spectral extent in either the positive or negative frequency domains. As an upper limit, the bandwidth of the unmodulated signal is the displayed frame rate. As noted in the above description, the frame rate has a likely value of 24 Hz. However, the present invention can be used with other frame rates. It must be noted that the "unmodulated" signal, as this term is used here, refers to continuous pixel intensity as is shown in FIG. 13. The actual bandwidth value is not controlled by the present invention; instead, W is dependent on the frame rate and on the scene content, frame to frame. Thus, a practical limit of bandwidth less than or equal to the frame rate is sufficient for purposes of the present invention.

(c) Modulation frequency $\xi_m$. This parameter is controlled using the method of the present invention, taking into consideration parameters (a) and (b) above and also considering practical constraints imposed by intensity limitations of the projection system. For any individual pixel or set of pixels, a modulation frequency $\xi_m$ is selected so that the effective bandwidth of the modulated signal is such that aliasing will be perceptible when sampled using a video camera.

The method of the present invention, then, consists in careful selection of a modulation frequency that is not visible to the unaided eye, but causes aliasing when sampled by a video camera.

As was noted with respect to FIG. 14, a result of using a finite sampling duration is the attenuation of higher order spectral components. For this reason, it is generally considered most practical to consider the first order (±1 order) spectral components for creating the aliasing effects of the present invention. Second order spectral components may also have sufficient energy to cause visible aliasing in some instances.

Referring to the examples illustrated by Tables 2, 3, 4, and 5, (see FIGS. 25–28, respectively) there are shown values of spectral spread for various modulation frequencies, using "flickerless" conditions of sampling frequency (i.e., $\xi_s$=120 Hz), varied for modulated signal bandwidth.

Recall from the above discussion that the spectral spread of the zero order modulated signal with modulation frequency $\xi_m$ and bandwidth W ranges from $-(\xi_m+W/2)$ to $(\xi_m+W/2)$. Table 6 below summarizes the spectral spread values for different spectral orders. In the example of FIG. 15, $\xi_m$=48 Hz and W/2=24, so that the spectral spread of the zero order component, according to Table 6, is −60 to +60 Hz.

Aliasing due to the 1$^{st}$ spectral order begins as soon as the following is true:

$$[\xi_s-(\xi_m+W/2)]<[(\xi_m+W/2)] \quad (24)$$

Solving the inequality for $\xi_m$ results in the lower limit for the modulation frequency:

$$\xi_m > \left(\frac{\xi_s - W}{2}\right) \quad (25)$$

Aliasing continues until the following condition holds:

$$[\xi_s+(\xi_m+W/2)]>-(\xi_m+W/2) \quad (26)$$

Solving inequality (26) for $\xi_m$ results in the upper limit for the modulation frequency. Thus, the condition for modulation frequency to produce first order aliasing can be expressed as follows:

$$\left(\frac{\xi_s - W}{2}\right) < \xi_m < \left(\frac{\xi_s + W}{2}\right) \quad (27)$$

Similar calculations can be carried out to determine the range of modulation frequencies that can produce aliasing for other orders. Table 7 summarizes these results for the first few orders, using the spectral spread values of Table 6.

TABLE 6

Spectral spread of the fundamental, ±1$^{st}$ and ±2$^{nd}$ orders for a signal with bandwidth W and modulation frequency $\xi_m$.

| | Spectral Range | |
|---|---|---|
| | From | To |
| 0$^{th}$ order | $-(\xi_m + W/2)$ | $+(\xi_m + W/2)$ |
| +1$^{st}$ order | $\xi_s - (\xi_m + W/2)$ | $\xi_s + (\xi_m + W/2)$ |
| −1$^{st}$ order | $-\xi_s - (\xi_m + W/2)$ | $-\xi_s + (\xi_m + W/2)$ |
| +2$^{nd}$ order | $2\xi_s - (\xi_m + W/2)$ | $2\xi_s + (\xi_m + W/2)$ |
| −2$^{nd}$ order | $-2\xi_s - (\xi_m + W/2)$ | $-2\xi_s + (\xi_m + W/2)$ |

TABLE 7

Modulation Frequency range that can produce aliasing for different orders

| Aliasing order | Modulation Range |
|---|---|
| +1$^{st}$ order | $(\xi_s - W)/2 < \xi_m < (\xi_s + W)/2$ |
| −1$^{st}$ order | $(-\xi_s - W)/2 < \xi_m < (-\xi_s + W)/2$ |
| +2$^{nd}$ order | $(2\xi_s - W)/2 < \xi_m < (2\xi_s + W)/2$ |
| −2$^{nd}$ order | $(-2\xi_s - W)/2 < \xi_m < (-2\xi_s + W)/2$ |

It must be noted that the aliasing conditions summarized in Table 7 are necessary—but not sufficient—conditions for visible aliasing. In order to obtain the necessary and sufficient conditions, it is necessary to look more closely at the actual frequency spread within each of the spectral orders. This is because it is unlikely that the entire spectral range of the modulated signal (i.e., $\pm(\xi_m+W/2)$) is populated with spectral components. To illustrate this point, re-examine FIGS. 14 and 15. If W/2 and $\xi_m$ are selected to be 12 and 48 Hz respectively, the modulated signal of FIG. 15, by definition, has a bandwidth of $\pm(\xi_m+W/2)=\pm60$ Hz, as was noted above. But, as evident from the figure, the energy of the spectrum in not uniformly distributed within the band of ±60 Hz. In fact, most of the energy is only concentrated around three spectral frequencies of 0, +48 and −48 Hz. Thus, if this signal is sampled, only the components around the main band, the left sideband and the right sideband of the higher orders have sufficient energy to create strong aliasing effects. In a practical system design, care must be taken to ensure that aliasing is caused by the portions of the spectrum with a significant amount of energy (i.e., by the main, left and right sidebands).

Tables 2–5 provide spectral spread calculations for different values of modulation frequencies, $\xi_m$. Entries in each table indicate the spectral spread of the main, left and right bands of the first and second spectral orders for the modulated and sampled signal. For example, in Table 2, the spectral spread of the left sideband of the $+1^{st}$ order for a signal with W/2=30, $\xi_s$=120 and $\xi_m$=50 Hz is calculated to be from 40 to 100 Hz. The results for the corresponding negative spectral orders can be obtained by reversing the signs of the entries. Also note that aliasing only becomes visible if the spectral spread of these higher orders falls somewhere within the frequency range ±40 Hz.

Using the straightforward calculations described above, any number of tables for a given sampling frequency $\xi_s$ and bandwidth can be derived, over any number of modulation frequencies, $\xi_m$. It is important to note that Tables 2–5, each tabulated frequency spread values for a different estimate of W/2 namely, W/2 of 30, 24, 12, 5, respectively. Alternatively, an exact value of W/2 could have been obtained by examining the Fourier transform of the time-varying function if the intensity values of the projected pixels within the target frames were precisely known. The selection of suitable modulation frequencies for causing aliasing can be accomplished by inspection of such tables.

Table 2 lists spectral spread values for 1st and 2nd spectral orders given a one-sided bandwidth W/2 of 30 Hz, sampling frequency $\xi_s$ of 120 Hz, for modulation frequencies from 50 Hz to 210 Hz.

Table 3 lists spectral spread values for 1st and 2nd spectral orders given a one-sided bandwidth W/2 of 24 Hz, sampling frequency $\xi_s$ of 120 Hz, for modulation frequencies from 50 Hz to 210 Hz.

Table 4 lists spectral spread values for 1st and 2nd spectral orders given a one-sided bandwidth W of 12 Hz, sampling frequency $\xi_s$ of 120 Hz, for modulation frequencies from 50 Hz to 210 Hz.

Table 5 lists spectral spread values for 1st and 2nd spectral orders given a one-sided bandwidth W of 5 Hz, sampling frequency $\xi_s$ of 120 Hz, for modulation frequencies from 50 Hz to 210 Hz.

For the purpose of finding a suitable modulation frequency $\xi_m$ under given conditions, the preferred approach is to consider worst-case conditions. Among factors to be considered is bandwidth. A narrow bandwidth is a worst-case condition, since it is more difficult to cause aliasing with a narrow bandwidth signal. Table 5, with values for a one-sided bandwidth W/2 of 5, represents worst-case conditions among Tables 2–5. Using just one example from Table 5, it can be seen that aliasing at frequencies within the visible range can be caused using modulation frequencies $\xi_m$ between 70 and 165 Hz. The optimum values appear in the middle of this range. For example, with a modulation frequency $\xi_m$ of 110 Hz, the left sideband of the $1^{st}$ order is centered at roughly around 10 Hz. This creates a distinctly visible aliasing condition, no matter how narrow the bandwidth. Other modulation frequency $\xi_m$ values near this 110 Hz frequency also are likely candidates for causing aliasing.

Note that negative spectral orders (−1 order, −2 order) are not listed in Tables 2–5. However, these values can be expressed simply by changing the sign for each spectral value listed.

Simple arithmetic calculations are all that is needed to obtain the values that populate successive rows of Tables 2–5. For the $1^{st}$ and $2^{nd}$ spectral orders in Tables 2–5, the location of the main band is determined by sampling frequency $\xi_s$. Since sampling frequency is 120 Hz, the $1^{st}$ spectral order main band is centered at 120 Hz ($\xi_s$). The $2^{nd}$ spectral order main band is centered at 240 Hz ($2\xi_s$) respectively. The From/To spread of the main band and of both left and right side bands is set by the bandwidth W, which differs for each of Tables 2–5. The left and right side bands are centered using the following simple calculation:

Center of main band−Modulation frequency
$\xi_m$=Center of left band (28)

Center of main band+Modulation frequency
$\xi_m$=Center of right band (29)

It should be noted that the previous analysis of aliasing assumed the simplest case, which is the use of a sinusoidal modulation frequency. In actual practice, it may prove advantageous to employ a different type of modulation signal waveform, as we will discuss in the next section.

Method of Preferred Embodiment

The present invention temporally modulates the displayed pixel intensities in such a way that objectionable patterns will be produced when the displayed pixel intensities are recorded with a video camcorder. More specifically, the displayed pixel intensities are modulated so that an observer of a displayed movie will not see any degradation in image quality, but any attempt to capture the displayed movie with a camcorder will result in aliased temporal frequency components that will be readily visible when the camcorder copy is subsequently viewed. According to the present invention, individual pixels or groups of pixels are modulated in various ways to produce specific spatial patterns in the video copy and to prevent a video pirate from circumventing the degradations that are produced by the patterns. The key aspects of the present invention are 1) the spatial arrangements of pixels that undergo temporal modulation; 2) the temporal modulation signal waveform; and 3) the temporal modulation frequency (or frequencies). We now discuss each of these aspects.

Referring to FIG. 18, there is represented an arbitrary frame 100 of a digital motion picture. Frame 100 comprises an array of pixels 102 that display the scene content. To display scene content in color, each individual pixel 102 actually comprises a red pixel 102R, a green pixel 102G, and a blue pixel 102B, where the red, green, and blue color pixels are visually overlapped and intensities are varied using color representation techniques well known in the imaging arts. However, for simplicity of description, the model of a single, generic pixel 102 is used here as a generalization. The description provided here refers to individual RGB color components only when necessary.

As FIG. 18 shows, a spatial pattern 104 of pixels 102 within frame 100 can be identified for modulation using the method of the present invention. There are numerous options for selecting and modulating one or more patterns 104 during display of a digital motion picture. Chief among selection options for specifying pattern 104 composition are the following, including combinations of the following:

(1a) random arrangement of pattern 104. In a preferred embodiment, a random selection of pixels 102 is used to produce a pattern 104 that is optimal for obscuring a video camera copy of the digital motion picture. Pattern 104 can be changed for each frame 100 or for each set of n frames. The use of a random modulated pattern 104 that is constantly changing obviates the use of temporal filters or other image processing techniques for re-creating an acceptable image from the degraded video copy.

Figure 19:
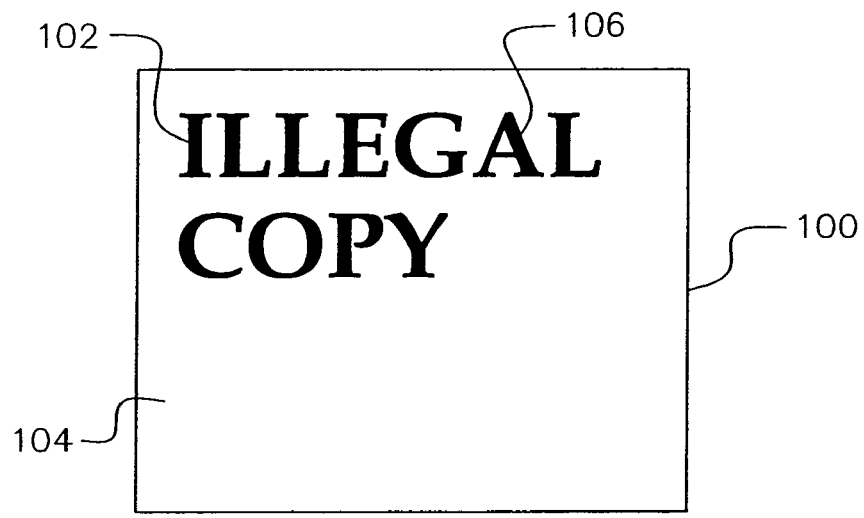
FIG. 19 is a plane view showing a digital motion picture frame with a message as a pattern.

(1b) arrangement of pattern 104 as a text message. In another preferred embodiment, pattern 104 could be employed as a "bitmap" for a message 106 comprising text and symbols, as shown in FIG. 19. Message 106 could be the same for each frame 100, such as a message that displays the name of the theater where the projection apparatus is located, but concurrently part of message 106 could be changed every n frames to display time-varying information such as the date and time. Message 106 could also display a simple message such as "ILLEGAL COPY" or "STOLEN," or a more detailed message could be displayed, such as a reward notice or other incentive for return of the illegal copy.

(1c) arrangement of pattern 104 as a pictorial image, possibly as part of an animation. Pattern 104 could be embodied as an image intended to obscure or provide information. Animation techniques could be employed to generate an informational or annoying pattern 104.

(1d) arrangement of pattern 104 as a watermark message. A watermark pattern 104 could comprise a plurality of modulated pixels 102 within various parts of frame 100. For example, an algorithm could be used for determining which pixels 102 are used to create a digital watermark, assigning a spatial distribution to the watermark. Cryptographic methods could be employed, in conjunction with the algorithm used for pixel 102 selection, to securely encode watermark information. In order to recover a message contained within a watermark pattern 104, a decryption key may be required for deciphering contents in accordance with the watermark embedding algorithm.

(1e) entire frame 100 considered as pattern 104. In certain implementations, it may be advantageous to modulate every pixel 102 within frame 100, typically with the same modulation frequency for every pixel. However, if such a method were used, it would then be preferable to change modulation frequency periodically or randomly, to prevent synchronization of video camera timing with modulation frequency.

The above techniques for pattern 104 selection are just some of the more likely techniques that could be used, all within the scope of the present invention.

There are some practical limitations that may constrain the modulation of an individual pixel within the chosen pattern 104. This is because the process of modulating the pixel intensity inherently results in a lower average intensity for a given peak intensity value. For example, if pixel 102 corresponds to a very bright displayed value, it may not be possible to modulate pixel 102 because the peak intensity that is needed to maintain the average intensity for pixel 102 may exceed the projector capabilities. Thus, it may be necessary to modulate other nearby pixels 102 or other areas of frame 100, where the peak intensity requirements can be met. Thus, pixels in an image frame may be analyzed according to a peak intensity criterion and pixels meeting the criterion further determine the pattern that is subject to the temporal modulation. This criterion may be pixels not exceeding a certain brightness level. Additionally, there may be some types of scene content or locations within the scene for which induced flicker may be perceptible at higher modulation frequencies than average. This may necessitate applying modulation to other regions of a displayed frame.

Some of these limitations are addressed in the present invention by choosing the proper mode for the temporal modulation. In a preferred embodiment, the modulation signal waveform is a sinusoid, as we described previously in the analysis of aliasing. A sinusoidal function will minimize the spectral extent of the frequency sidebands that are produced by the modulation, which makes it somewhat easier to place the sidebands at the desired frequency position. However, many projection systems may not be capable of modulating the pixel intensities according to a pure sinusoidal waveform, so another preferred embodiment is to approximate a sinusoidal waveform using a rectangular or sawtooth modulation signal waveform. In a preferred embodiment using a rectangular modulation waveform, a 50% duty cycle is used, which requires a doubling of the peak pixel intensity to maintain the same average intensity as an unmodulated signal. In still another preferred embodiment, the rectangular waveform may not be completely dark during the OFF period, in order to reduce the peak pixel intensities that are required to maintain a desired average intensity. This potentially allows for more pixels to be modulated when a display device has a limited maximum intensity. The tradeoff is that the resulting aliased components will not be as severe as a full ON/OFF modulation. Another useful variation of the modulation waveform is to use a duty cycle of more than 50%, which also lessens the peak intensity that is required to maintain the same average intensity. Any number of other possible modulation waveforms can be employed, all within the scope of the present invention.

In addition to the basic shape of the modulation signal waveform, there are a number of temporal modulation options for pattern 104 as part of the present invention. These temporal modulation options include the following, and combinations of the following:

(2a) using a single modulation frequency. In a preferred embodiment, a single modulation frequency is used to modulate the pixels that comprise pattern 104. It is advantageous to change the modulation frequency periodically or randomly, in order to frustrate attempts to synchronize video camera recording equipment to the modulation rates in use.

Figure 20:
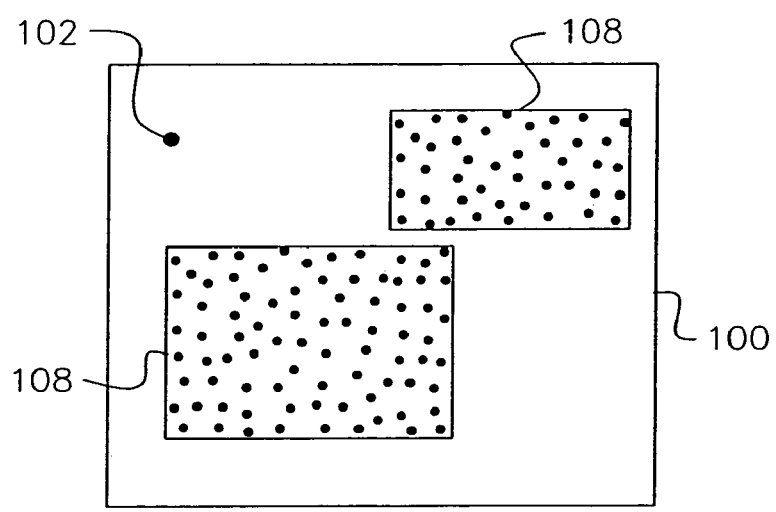
FIG. 20 is a plane view showing a digital motion picture frame with multiple regions defined for modulation of patterns.

(2b) using multiple modulation frequencies. In another preferred embodiment, two or more different modulation frequencies are used in two or more regions 108 of frame 100, as is shown in FIG. 20. The use of different modulation frequencies within a frame 100 allows for video cameras with different sampling rates to be simultaneously affected to the maximum extent. Even with a single camera operating at a single sampling rate, the use of two or more modulation frequencies in different regions will introduce patterns that flicker at different rates, which can be highly objectionable. When multiple modulation frequencies are used within the same frame, it is extremely difficult to synchronize video camera recording equipment to all modulation rates simultaneously. However, it again may be advantageous to change the modulation frequencies periodically or randomly, in order to further frustrate attempts to synchronize the video camera to the modulation rates in use.

(2c) modulation of pixels 102R, 102G, 102B in pattern 104. Pixels in each R, G, and B color plane can be modulated independently of one another or synchronously, within the scope of the present invention. It may be advantageous to modulate pixels within only one or another color plane to simplify apparatus design, for example.

(2d) using frequency modulation techniques as a form of digital watermarking. In addition to obscuring any video camera copy, modulation of pattern 104 can also be used to encode an information signal. Changes in modulation frequency can thereby be used as an encoding technique for copy watermarking and for information such as location, time and date of projection, identifying number of the film copy sent, and related information.

(2e) using pulse-width modulation. This variation on a frequency modulation technique uses manipulation of the duty cycle of pixels 102. Pulse width modulation can be particularly useful where intensity levels needed for pixel 102 modulation may not be possible for a projector to achieve at 2×, as is needed for a 50% duty cycle modulation. Using this technique, however, the intensity must be preserved for each modulated pixel 102.

(2f) using amplitude modulation. This modulation technique can employ the inherent capability for digital cinema to control intensity of each pixel 102 over a range. An amplitude modulation scheme would enable encoding of watermark information within a sequence of variable intensity values.

It would also be feasible to combine or to alternate any of methods (2a) through (2f) to implement a hybrid modulation scheme for digital watermarking, within the scope of the present invention.

Once selections have been made for the spatial arrangement of pattern 104 (as in methods (1a)–(1e)) and the temporal modulation waveform and mode (as in methods (2a)–(2f)), it is necessary to choose the specific modulation frequency (or frequencies). In general, a reasonable design approach is to select the modulation frequency so that one of the first-order side bands of the sampled signal is centered in the frequency range of approximately 10 to 30 Hz. This produces an aliased component in the sampled signal that is in the peak sensitivity range of the human visual system as shown in FIG. 1. From equations 28 and 29, we can see that this design approach is equivalent to satisfying the following equation:

$$10 \text{ Hz} \leq |\text{Sampling frequency } \xi_s - \text{Modulation frequency } \xi_m| \leq 30 \text{ Hz}. \quad (30)$$

For example, if the sampling frequency $\xi_s$ of the specified camcoder is 120 Hz, then a modulation frequency of either 100 Hz or 140 Hz will place the center of a first-order side band at 20 Hz, thus producing a strong aliased component in the sampled video signal. Since many camcorders use a sampling frequency of either 60 Hz or 120 Hz, the selection of a modulation frequency at 90 Hz will produce an aliased component at 30 Hz for either sampling frequency. In this way, a single modulation frequency can produce the desired effect regardless of the particular camcorder that is used. However, as described in methods (2a)–(2b), it may be advantageous to use different modulation frequencies, either for different regions within a single frame or for a given region across multiple frames, to provide an even greater deterrent to video piracy. For example, using modulation frequencies of 80 Hz and 100 Hz for different regions in a frame 100 will produce aliased components at 20 Hz and 40 Hz regardless of whether the sampling frequency is 60 Hz or 120 Hz. In this way, there is always an aliased component in the camcorder video at 20 Hz, which is near the peak flicker sensitivity, thus producing a highly objectionable pattern. In other applications, it may be desirable to select a modulation frequency that moves the aliased component to very low temporal frequencies, say less than 10 Hz. The visual appearance of a slowly varying pattern may not be as visually objectionable as a rapidly varying pattern, but if pattern 104 represents a text message, the slowly varying pattern may be more easily comprehended. Finally, when changing the modulation frequency (or frequencies) periodically or randomly to prevent the synchronization of video recording equipment, the amount of change from the preferred frequency (or frequencies) does not need to be extremely large. Even small changes, such as ±5 Hz, will be sufficient to prevent continuous synchronization.

Summary of Steps for Implementation of Method

The basic steps for implementing the method of the present invention are as follows:

1. Identify pattern 104 to be used. Decide upon a strategy for displaying pattern 104, using options (1a)–(1e) given above, or some other technique for pattern 104. This decision depends, in large part, on the purpose for which this invention is to be applied. For example, when maximally obscuring any copied movie content is the goal, as in the preferred mode of the present invention, a randomly changing pattern 104 has advantages.
2. Select the appropriate mode for temporal modulation. Options (2a)–(2f) given above provide the preferred options for temporal modulation available in implementing the present invention.
3. Select the appropriate modulation frequency or frequencies. Suitable modulation frequencies can be identified using the techniques described above and those used to generate Tables 2–5. As was noted, the best option is generally to employ first order frequencies for aliasing; however, there can be applications where second order aliasing has advantages.

Figure 21:
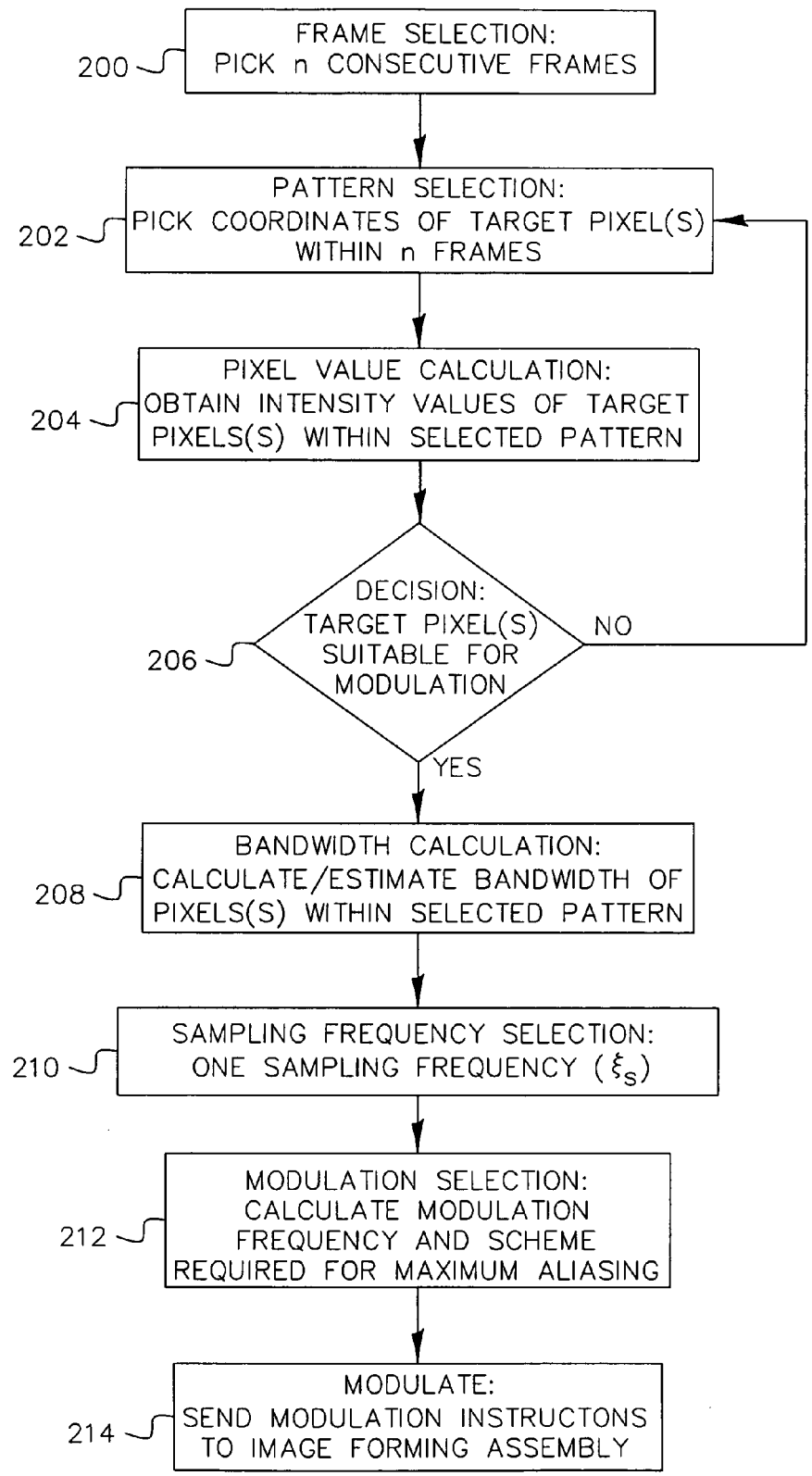
FIG. 21 is a flow chart showing the decision process followed for the method of the present invention.

The general flow diagram for implementation of the copy-deterrent pattern is shown in FIG. 21. In a Frame Selection step 200, n consecutive frames 100 are selected for implementation of the copy-deterrent pattern. Next, in a Pattern Selection step 202, specific pixel 102 locations within copy-deterrent pattern 104 are selected. As mentioned above, pixels 102 for modulation may be simply selected at random or may comprise a text or encrypted message. In a Pixel Value Calculation step 204, the intensity values of selected pixels 102 (that make up copy-deterrent pattern 104 and are spanned over n frames 100) are calculated. This calculation may simply entail computation of individual R, G and B values or may include computation of an average or hybrid luminance or chrominance measure. In a Decision step 206, it is made certain that output intensity characteristics/limitations of the projection system do not prevent the selected pixels 102 from being modulated and projected. If projection is not possible, new pixels 102 must be selected. In a Bandwidth Calculation step 208, the bandwidth of the selected pixel intensity pattern (that is spanned over n frames) is calculated and/or estimated. As noted earlier, this bandwidth is less than the frame 100 projection rate but its exact value depends on the movie content (i.e., number of selected frames 100 and the pixel 102 intensity values within the selected frames 100). Since the number of frames 100 and the intensity values of the selected pixels 102 are precisely known, bandwidth calculations may be carried out by taking the Fourier transform of the selected pixels 102 and examining its spectrum. However, since this process may require a considerable amount of computation, a simple estimate of the bandwidth (e.g., W/2~5 Hz for a very conservative estimation) may be used.

The next step is a Sampling Frequency Selection step 210. This can be selected to be one of several standard sampling rates (e.g., 50, 60, 100, 120 Hz, etc.) used in today's camcorders. It is also possible to select one sampling frequency value for the first $n_1$ set of frames 100 and select a different sampling rate for the next $n_2$ set of frames 100. Alternatively, or in conjunction with above, different sampling rates for different regions 108 within the frame 100 may be used to carry out the calculations. This way, copy-deterrent pattern 104 would affect a wider variety of camcorders. In a Modulation Selection step 212, the appropriate modulation scheme (or a combination of them) as is outlined in (2a)–(2e) above is used at the appropriate modulation frequency to produce aliasing for the chosen sampling rate. In order to broaden the effectiveness of this technique, a range of modulation schemes and frequencies may be used to affect the same set of pixels 102 but in different set of "n" frames 100. Finally, once the appropriate modulation scheme and frequency is selected, the necessary information is supplied to image-forming assembly 16 in a Modulate step 214 in order to affect the projection of pixels 102.

Apparatus of Preferred Embodiment

Figure 22:
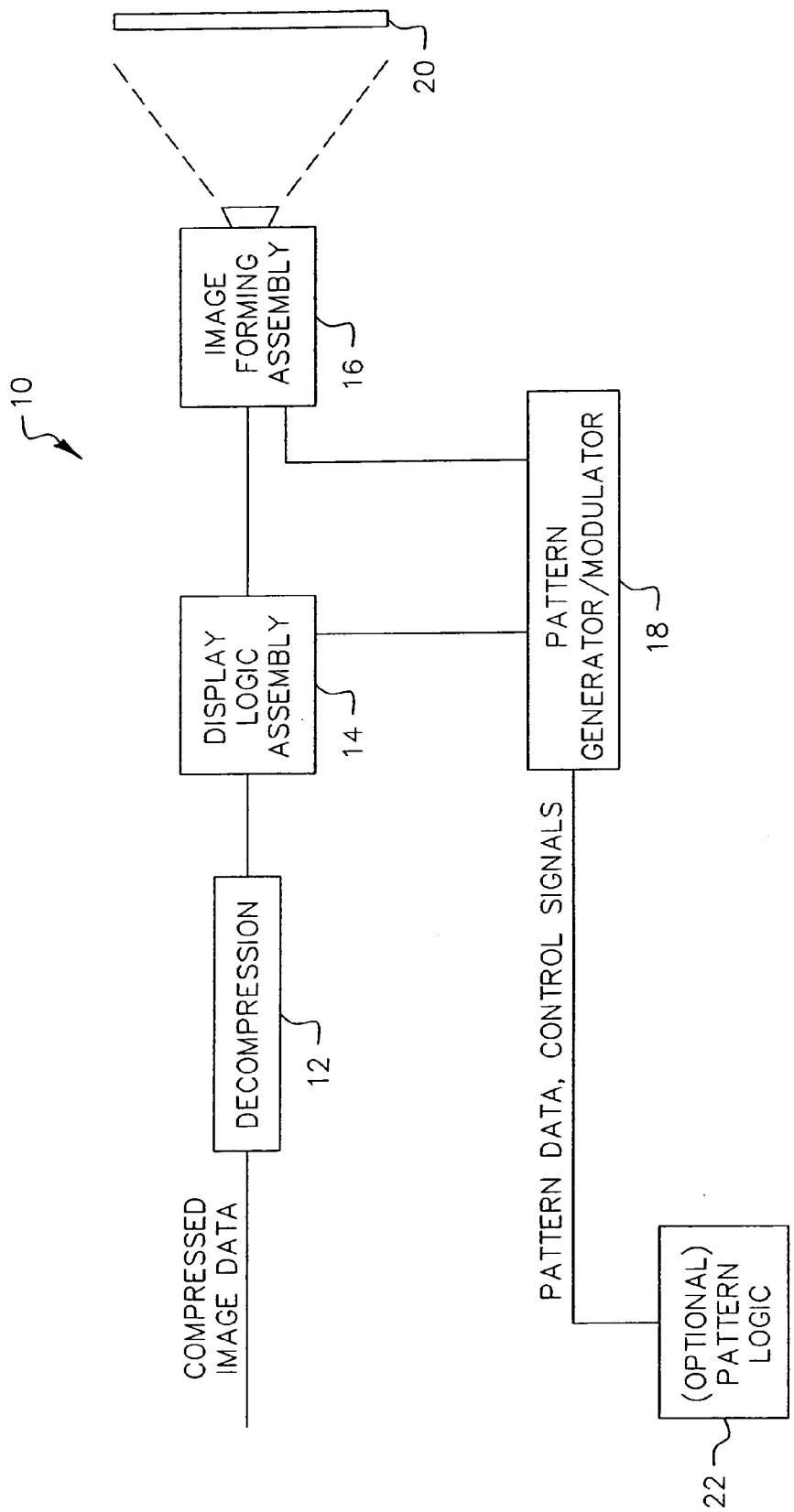
FIG. 22 is a schematic block diagram showing major components of the copy-deterrent projection apparatus of the present invention.

Referring to FIG. 22, there is shown a block diagram of a copy-deterrent projection apparatus 10 with an arrangement of components for implementing the present invention in a preferred embodiment. Image data for projection of each frame 100 is typically provided in compressed form and may be transmitted to the projecting site or provided on storage media. In any event, compressed image data is input to a decompression circuit 12. Decompression circuit 12 decompresses frame 100 data and provides this data to a display logic assembly 14. Display logic assembly 14 formats the image data for frame 100 into pixel array format and provides the necessary color correction, image resizing, and related functions. Then the data is passed to an image forming assembly 16 for display onto a display screen 20. The decompression and display sequence and apparatus just described are familiar to those skilled in the digital motion picture projection arts and may be embodied using a number of different types of components.

Pattern data and control parameters are provided to a pattern generator/modulator assembly 18 for generating and modulating pattern 104. Pattern data and control parameters can be provided from a number of sources. For example, pattern data and control parameters can be provided by the motion picture supplier, provided along with the compressed image data. This arrangement would put the movie supplier in control of pattern 104 generation for copy protection. At the other extreme, copy protection could be solely in the domain of the projection site itself. In such a case, pattern data and control parameters can be provided by optional pattern logic circuitry 22, indicated by a dashed box in FIG. 22, or can be generated on the fly at the time of projection, based on known characteristics of the movie that must be provided to the projection site. Other possibilities include some combination of control by the movie supplier and local control by the projection site.

The object is to provide the location of pixels 102 as well as modulation frequency and intensity variation data. As is described previously for methods (1a)–(1e) and (2a)–(2f), plaintext or encrypted information can be sent by selection of specific location, frequency, and intensity data for modulation of pixels 102. Significantly, pattern generator/modulator assembly 18 provides this location, frequency, and intensity data for modulation, assigned to existing pixels 102 in frame 100. That is, pattern generator/modulator assembly 18 does not provide "new" pixels 102 relative to the scene content for frame 100. Instead, the output from pattern generator/modulator assembly 18 can be considered as control signals, sent to image forming assembly 16, in order to manipulate the scene content that is sent from display logic assembly 14.

Pattern generator/modulator assembly 18 provides modulation information for pixels 102 within pattern 104 that are sent to the display logic assembly 14 and the image forming assembly 16 for projection.

It is instructive to note that, in addition to image forming assembly 16, decompression circuit 12, and display logic assembly 14, pattern generator/modulator assembly 18 can be part of projector 10 as in the preferred embodiment or can be separate components, such as components running on a separate computer or other processor.

Image forming assembly 16 may employ any one of a number of display technologies for projection of a sequence of frames 100 onto display screen 20. In a preferred embodiment, image forming assembly 16 comprises a transmissive Liquid-Crystal Device (LCD) spatial light modulator and support components for projection of frames 100. Pattern 104 data may be used to modulate individual pixels within the LCD for each color. Or, a separate LCD may be employed for modulation of pattern 104. Other types of modulator could alternately be used, including a digital micromirror device (DMD) or reflective LCDs, for example.

Figure 23:
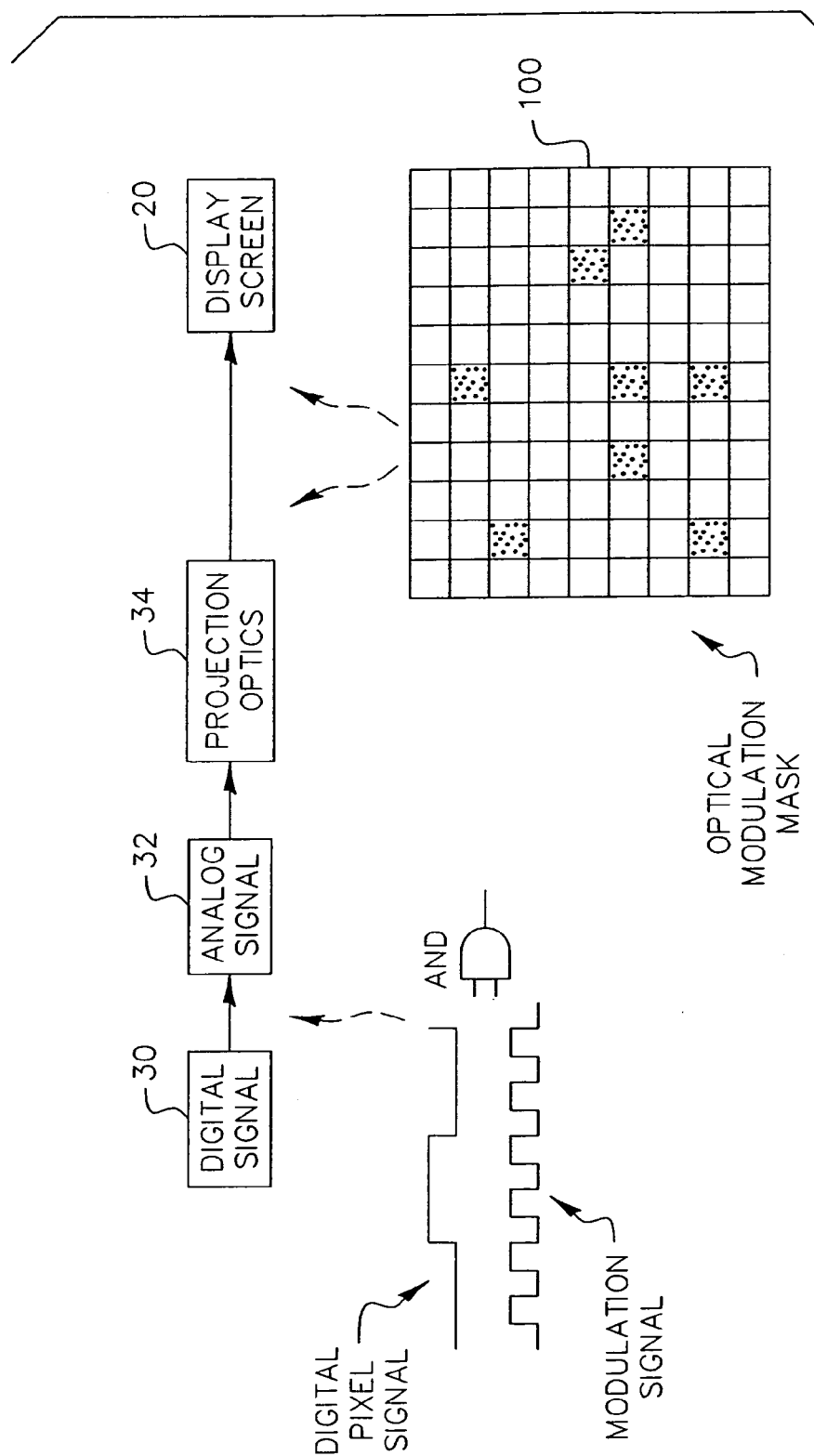
FIG. 23 is a block diagram showing the signal conversion path for a digital projection system.

Alternate Techniques for Applying Modulation:

The apparatus of the present invention can employ any of a number of different techniques for applying modulation to pattern 104. Referring to FIG. 23 which shows the signal path that applies for projection of each pixel 102 in frame 100, methods for applying modulation include the following:

(a) Modulation at digital control circuitry. In the preferred embodiment, modulation is applied to a digital signal 30 within the digital control circuitry used for generation of the array of pixels 102 in each frame 100. With this method, the digital values that correspond to pixels 102 in each frame 100 are modulated in accordance with the modulation scheme. An example of a 50% duty-cycle square wave modulation is depicted in FIG. 23 as an "AND" operation that can be readily implemented in digital domain.

(b) Analog modulation. Analog modulation is possible, using some method for modulation of an analog signal 32 that controls intensity of the light source used for pixels 102 within pattern 104, for example. Analog modulation techniques, as opposed to the digital techniques of part a, manipulate continuous-time analog signals. Nevertheless, similar concepts of modulation can be carried over from the digital domain to the analog domain.

(c) Optical modulation. Optical modulation could be implemented using techniques of projection optics 34 such as shuttering, masking, or controlled pixel emission. Optical modulation could be applied within image forming assembly 16 as well as at display screen 20, using masking or filtering techniques. Referring to FIG. 23, the optical modulation mask 216, for example, can be used either in front of the projection optics or on top of the display screen to selectively manipulate the projected pixel locations. Liquid crystal display material, with electrically controlled transmission characteristics, may be used to construct such a spatial light modulation mask; the opacity of different regions of such a mask may be controlled by changing the applied electrical signal to that region of the mask.

As was noted above, modulation can be differently applied for each color component of frame 100.

Alternative Embodiments

Figure 24:
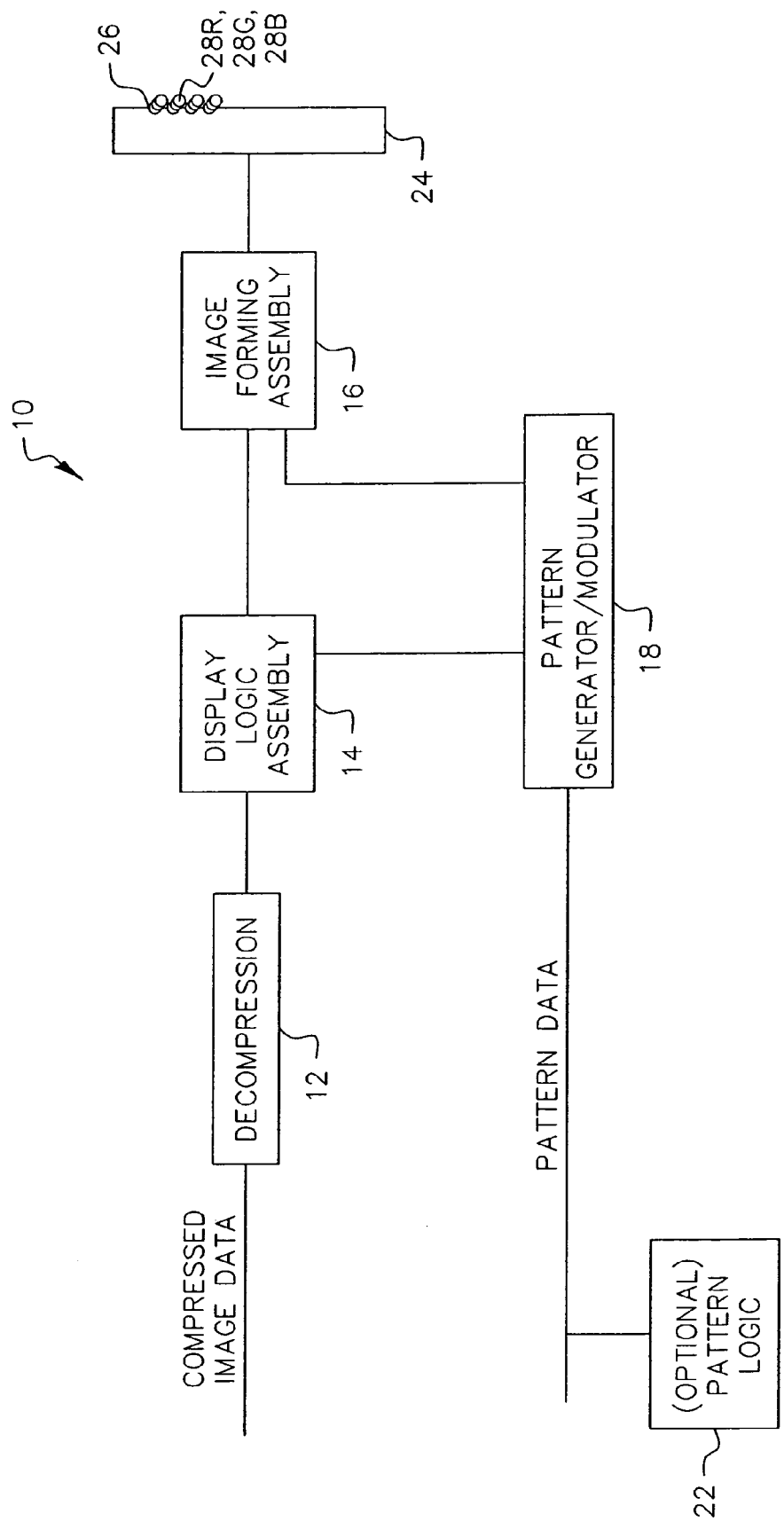
FIG. 24 is a schematic block diagram showing major components of an alternative embodiment of the copy-deterrent projection apparatus of the present invention.

Referring to FIG. 24, there is shown an alternate embodiment for copy-deterrent projection apparatus 10, in which image forming assembly 16 does not project onto display screen 20. Instead, image forming assembly 16 communicates with an emissive display panel 24. Emissive display panel 24 may be in the form of a panel that comprises an LED array 26, similar to the display panels widely used in large sports facilities, for example. Using display panel 24 of this type, image forming assembly 16 directly controls the intensity and modulation of red, green, and blue LEDs, 28R, 28G, and 28B, respectively.

While the invention has been described with particular reference to its preferred embodiments, it will be understood by those skilled in the art that various changes may be made and equivalents may be substituted for elements in the preferred embodiments without departing from the scope of the invention. For example, copy-deterrent pattern 104 can comprise any of a number of arrangements of pixels 102 to form messages 106 or regions 108 anywhere within frame 100. Copy-deterrent patterns 104 can be provided primarily in order to obscure a recording or to provide digital watermarking, or both. The present invention is adaptable to a number of possible configurations of digital motion projector and display screen apparatus, such as using micromirror technology or a light valve array, for example.

Therefore, what is provided is a copy-deterrent projection apparatus for digital motion pictures and a method for applying modulation to pixels within a displayed motion picture frame in order to discourage recording of the image using a video camera.

PARTS LIST

10. Copy-deterrent projection apparatus
12. Decompression circuit
14. Display logic assembly
16. Image forming assembly
18. Pattern generator/modulator assembly
20. Display screen
22. Pattern logic circuitry
24. Emissive display panel
26. LED array
28R, 28G, 28B. Red LED, Green LED, Blue LED
30. Digital signal
32. Analog signal
34. Projection optics
100. Frame
102. Pixel
102R, 102G, 102B. Red pixel, Green pixel, Blue pixel
104. Pattern
106. Message
108. Regions
200. Frame Selection step
202. Pattern Selection step
204. Pixel Value Calculation step
206. Decision step
208. Bandwidth Calculation step
210. Sampling Frequency Selection step
212. Modulation Selection step
214. Modulate step
216. Optical Modulation Mask

The invention claimed is:

1. A copy-deterrent display apparatus for displaying a sequential plurality of image frames of a digital motion picture, each of said image frames comprising an array of pixels, each said pixel assigned to be displayed at a predetermined intensity within each frame, said apparatus comprising:
   (a) a pattern generator/modulator assembly capable of providing control signals specifying a pattern of pixels within each said frame, said control signals specifying temporal modulation of said pattern of pixels at predetermined frequency or frequencies within a frame period so that each of certain pixels are multiply pulsed during a frame period, wherein said temporal modulation is chosen to be at a frequency imperceptible to a human observer observing the digital motion picture displayed on said display apparatus while simultaneously producing objectionable artifacts selected from the group consisting of an obscuring pattern, an obscuring message and a watermark due to image aliasing when said displayed frames are captured by a sampling video capturing device wherein said image aliasing results from the presence of relatively strong temporal frequency components that are within the visible frequency range when captured by the video capturing device; and
   (b) an image forming assembly capable of accepting said control signals from said pattern generator/modulator assembly and of modifying the displayed pixel intensities within each said frame in response to said control signals.

2. The apparatus of claim 1 wherein said modulated pattern of pixels comprises a text message.

3. The apparatus of claim 1 wherein said modulated pattern of pixels comprises a predetermined copy obscuration pattern.

4. The apparatus of claim 1 wherein said modulated pattern of pixels comprises a random pattern.

5. The apparatus of claim 1 wherein said modulated pattern of pixels comprises a digital watermark.

6. The apparatus of claim 1 wherein said modulated pattern of pixels substantially comprises said frame.

7. The apparatus of claim 1 wherein said image forming assembly uses a spatial light modulator to display said pixels within said frames.

8. The apparatus of claim 7 wherein said spatial light modulator comprises a liquid-crystal device.

9. The apparatus of claim 7 wherein said spatial light modulator comprises a digital multimirror device.

10. The apparatus of claim 7 wherein said spatial light modulator comprises an emissive display device.

11. The apparatus of claim 1 wherein said temporal modulation encodes a digital watermark.

12. The apparatus of claim 1 wherein said output control signals condition digital data within said image forming assembly.

13. The apparatus of claim 1 wherein said output control signals condition analog signal levels within said image forming assembly.

14. The apparatus of claim 1 wherein said output control signals condition an optical path within said image forming assembly.

15. The apparatus of claim 14 wherein said optical path modulates said pattern of pixels using a shutter.

16. The apparatus of claim 14 wherein said optical path modulates said pattern of pixels using a spatial light modulation mask.

17. A method for displaying a digital motion picture that is provided with a copy-deterrent pattern in a sequential plurality of image frames of the digital motion picture, each of said image frames comprising an array of pixels, said pattern comprising a plurality of pixels selected from said frame, the method comprising temporally modulating said pattern by multiple pulsing of selected pixels within a frame period wherein said temporal modulation is chosen to be at a frequency or frequencies imperceptible to a human observer observing the digital motion picture displayed on a display apparatus while simultaneously producing objectionable artifacts selected from the group consisting of an obscuring pattern, an obscuring message and a watermark due to aliasing when said displayed frames are captured by a sampling video capturing device wherein said image aliasing results from the presence of relatively strong temporal frequency components that are within the visible frequency range when captured by the video capturing device.

18. The method of claim 17 wherein said copy deterrent pattern comprises a message.

19. The method of claim 17 wherein said copy deterrent pattern comprises a predetermined copy obscuration pattern.

20. The method of claim 17 wherein said copy deterrent pattern comprises a random pattern.

21. The method of claim 17 wherein said copy deterrent pattern comprises a digital watermark.

22. The method of claim 17 wherein said copy deterrent pattern substantially comprises said frame.

23. The method of claim 17 wherein the plurality of image frames form part of a digital movie or video image having a predetermined refresh rate and wherein said pattern is temporally modulated at a frequency higher than the refresh rate.

24. The method of claim 23 and wherein the temporal modulation is sinusoidal.

25. The method of claim 24 and wherein intensity of the pixels comprising the modulated pattern is adjusted to compensate for the modulation.

26. The method of claim 23 and wherein the modulation is a rectangular wave.

27. The method of claim 26 and wherein intensity of the pixels comprising the modulated pattern is adjusted to compensate for the modulation.

28. The method of claim 23 and wherein one or more color components of an image in the frame is subject to said temporal modulation but other color components of the same image frame are not subject to said temporal modulation.

29. The method of claim 23 and wherein the pattern comprises a portion of an image frame.

30. The method according to claim 23 and wherein the pattern comprises plural portions and the plural portions are temporarily modulated at different frequencies from each other.

31. The method according to claim 23 and wherein the frequency of modulation is changed from one frequency to another frequency during the course of display.

32. The method according to claim 23 and wherein the plurality of pixels are analyzed according to a peak intensity criterion and pixels meeting the criterion further determine the pattern that is subject to the temporal modulation.

33. The method according to claim 23 and wherein in order to provide copy deterrence to a video capturing device having a sampling frequency of 60 Hertz and/or 120 Hertz a temporal modulation frequency is used that meets the criteria of the absolute value of the difference between the sampling frequency and the temporal modulation frequency is greater than or equal to 10 Hertz and less than or equal to 30 Hertz.

34. The method of claim 17 and wherein the temporal modulation is sinusoidal.

35. The method of claim 34 and wherein intensity of the pixels comprising the modulated pattern is adjusted to compensate for the modulation.

36. The method of claim 17 and wherein the modulation is a rectangular wave.

37. The method of claim 36 and wherein intensity of the pixels comprising the modulated pattern is adjusted to compensate for the modulation.

38. The method of claim 17 and wherein one or more color components of an image in the frame is subject to said temporal modulation but other color components of the same image frame are not subject to said temporal modulation.

39. The method of claim 17 and wherein the pattern comprises a portion of an image frame.

40. The method according to claim 17 and wherein the pattern comprises plural portions and the plural portions are temporarily modulated at different frequencies from each other.

41. The method according to claim 17 and wherein the frequency of modulation is changed from one frequency to another frequency during the course of display.

42. The method according to claim 17 and wherein the plurality of pixels are analyzed according to a peak intensity criterion and pixels meeting the criterion further determine the pattern that is subject to the temporal modulation.

43. The method according to claim 17 and wherein in order to provide copy deterrence to a video capturing device having a sampling frequency of 60 Hertz and/or 120 Hertz a temporal modulation frequency is used that meets the criteria of the absolute value of the difference between the sampling frequency and the temporal modulation frequency is greater than or equal to 10 Hertz and less than or equal to 30 Hertz.

44. The method of claim 17 and wherein the displayed pixel intensities are modulated so that an observer of the displayed movie will not see any degradation in image quality.

45. The method of claim 17 and wherein a random selection of pixels is used to produce the copy-deterrent pattern that is optimal for obscuring a video camera copy of the digital motion picture.

46. The method of claim 17 and wherein the copy-deterrent pattern is changed for each set of n frames.

47. The method of claim 17 and wherein pixels in an image frame are analyzed according to a peak intensity criterion and pixels meeting the criterion determine the pattern that is subject to the temporal modulation.

48. The method of claim 17 wherein the copy-deterrent pattern is encoded using amplitude modulation to encode the pattern within a sequence of variable intensity values.

49. A method for identifying a candidate modulation frequency to be applied to a selected pattern of pixels within a sequence of digital motion picture frames, said candidate modulation frequency intended to cause aliasing when the sequence of digital motion picture frames is sampled using a video capture device, said method comprising:
 (a) selecting a plurality of sequential frames;
 (b) obtaining intensity values for each pixel within said selected pattern of pixels;
 (c) calculating a modulation intensity value for each said pixel within said selected pattern of pixels, said modulation intensity value conditioned by the duty cycle for a modulation signal waveform;

(d) calculating a bandwidth for said pixels within said selected pattern of pixels;
(e) choosing a target sampling frequency; and
(f) calculating said candidate modulation frequency based on said target sampling frequency and based on predetermined thresholds for visible modulation, said candidate modulation frequency selected based on having a first order or a second order side band within bounds of said predetermined thresholds for visible modulation.

* * * * *